United States Patent
Jakobsen et al.

(10) Patent No.: US 9,729,689 B2
(45) Date of Patent: Aug. 8, 2017

(54) DESKTOP TELEPHONE SYSTEM

(71) Applicant: GN Netcom A/S, Ballerup (DK)

(72) Inventors: Kim Ziersen Jakobsen, Ballerup (DK);
Per Koch Jensen, Ballerup (DK); Ulrik Allum Rasmussen, Ballerup (DK);
Stefan Heise, Ballerup (DK)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 15/119,470

(22) PCT Filed: Feb. 21, 2014

(86) PCT No.: PCT/EP2014/053458
§ 371 (c)(1),
(2) Date: Aug. 17, 2016

(87) PCT Pub. No.: WO2015/124206
PCT Pub. Date: Aug. 27, 2015

(65) Prior Publication Data
US 2017/0013103 A1 Jan. 12, 2017

(51) Int. Cl.
*H04M 1/00* (2006.01)
*H04M 1/60* (2006.01)
(Continued)

(52) U.S. Cl.
CPC ........... *H04M 1/60* (2013.01); *H04M 1/6066* (2013.01); *H04M 1/7253* (2013.01); *H04M 3/42263* (2013.01); *H04M 2250/02* (2013.01)

(58) Field of Classification Search
CPC .... H04M 1/60; H04M 1/7253; H04M 1/6066; H04M 2250/02
See application file for complete search history.

(56) References Cited

U.S. PATENT DOCUMENTS

| | | | |
|---|---|---|---|
| 2004/0248595 A1 | 12/2004 | Hicks et al. | |
| 2006/0166674 A1* | 7/2006 | Bennett | H04W 88/06 455/445 |
| 2007/0287438 A1* | 12/2007 | Hansen | H04M 3/54 455/417 |
| 2011/0207447 A1* | 8/2011 | Bhow | H04M 1/2535 455/417 |
| 2011/0306393 A1* | 12/2011 | Goldman | H04M 1/6066 455/575.2 |
| 2011/0312304 A1* | 12/2011 | Pedersen | H04M 1/08 455/414.1 |
| 2013/0070740 A1 | 3/2013 | Yovin | |
| 2013/0260840 A1* | 10/2013 | Pedersen | H04M 1/6066 455/569.1 |

(Continued)

FOREIGN PATENT DOCUMENTS

WO WO 2014/070198 5/2014

OTHER PUBLICATIONS

International Search Report for PCT/EP2014/053458 dated Nov. 5, 2014.

*Primary Examiner* — Tuan D Nguyen
(74) *Attorney, Agent, or Firm* — Altera Law Group, LLC

(57) ABSTRACT

The present invention relates to a desktop telephone system (1, 51, 61) and to a method for operating a desktop telephone system (1, 51, 61) and may advantageously be utilized in voice communication systems connected to telephone networks (7, 11, 67). The present invention provides a desktop telephone system (1, 51, 61) that can handle a number of ambiguous or complex situations that can occur in daily use of known headset systems.

The desktop telephone system (1, 51, 61) comprises two or more sound interface devices (2, 3, 4, 8, 62, 63, 64) each providing a sound interface to a user during telephone conversations and two or more gateway devices (2, 3, 62, 63) each serving as a telephone gateway between a telephone network (7, 11, 67) and each sound interface device (2, 3, 4, 8, 62, 63, 64) during telephone conversations. Each gateway device (2, 3, 62, 63) provides a call announcement signal (21, 41) in response to detecting an incoming telephone call (20, 40) from a telephone network (7, 11, 67), and each sound interface device (2, 3, 4, 8, 62, 63, 64) comprises an action detector (22, 30) providing a user accept signal (23, 31) in response to detecting a predefined accept action performed by the user. At least one gateway device (2, 3, 62, 63) provides the call announcement signal (21, 41) to a wireless control network (18), and at least one sound interface device (2, 3, 4, 8, 62, 63, 64) provides the user accept signal (23, 31) to the wireless control network (18). The desktop telephone system (1, 51, 61) further comprises a control device (19, 52) adapted to receive a first call announcement signal (21, 41) and a first user accept signal (23, 31), at least one of these from the wireless control network (18), to determine a first gateway device (2, 3, 62, 63) as source of the first call announcement signal (21, 41), to determine a first sound interface device (2, 3, 4, 8, 62, 63, 64) as source of the first user accept signal (23, 31), to (Continued)

determine a relationship between the first call announcement signal (21, 41) and the first user accept signal (23, 31), and to cause the desktop telephone system (1, 51, 61) to establish an audio connection (15, 16, 17, 44, 47, 48) between the first gateway device (2, 3, 62, 63) and the first sound interface device (2, 3, 4, 8, 62, 63, 64) in dependence on the determined relationship.

15 Claims, 6 Drawing Sheets

(51) Int. Cl.
      *H04M 1/725*     (2006.01)
      *H04M 3/42*     (2006.01)

(56) References Cited

U.S. PATENT DOCUMENTS

2014/0235253 A1*   8/2014   Li ........................ H04L 65/1069
                                                                455/445

* cited by examiner

9,729,689 B2

DESKTOP TELEPHONE SYSTEM

TECHNICAL FIELD

The present invention relates to a desktop telephone system and to a method for operating a desktop telephone system. The invention may advantageously be utilized in voice communication systems connected to telephone networks and having stationary or semi-stationary devices.

BACKGROUND ART

Telephone networks provide a means for communicating orally with other people over large distances. The classic PSTN (Public Switched Telephone Network) is increasingly replaced and/or augmented by newer telephone network types, such as e.g. ISDN networks, GSM and UMTS cellphone networks as well as IP Telephony, also known as Voice over Internet Protocol (VoIP) networks. At the same time, the variety of telephone devices and other voice communication devices used as interfaces to telephone networks is increasing. These developments generally increase system complexity, and it is an ongoing challenge for the telephone industry to provide easy-to-use systems and devices to the users and at the same time allow the users to effortlessly switch between different devices and/or different modes of using the devices. Known systems thus typically fail to provide desired handling flexibility to the user and/or require the execution of complicated manual configuration or connection procedures to achieve such flexibility.

US patent application 2011/306393 discloses a headset system with a headset base unit and a wireless headset. The headset base unit comprises a housing, a headset holder and a display device with a touch-screen display. When not in use, the headset may be arranged on the headset holder. The headset system can be connected to a number of telecommunication terminals or devices, such as a desk phone, a PC and a mobile phone. The headset base unit also comprises a speaker for generating an audible feedback to the user when operating the touch display and to signal e.g. an incoming soft phone call on the PC. The desk phone and the PC may each be connected to the headset base unit via wires, while the mobile phone may be connected via a wireless connection, such as e.g. a Bluetooth™ connection. The wireless connection between the headset and the headset base unit may e.g. be a DECT connection or a Bluetooth connection. The headset may also be connected directly to the mobile phone, e.g. via a Bluetooth connection. The desk phone may be a DECT wireless telephone with a phone base and a wireless handset connected thereto via a DECT connection. The headset base unit and the phone base may further be connected via a second DECT connection, and the headset base unit and the handset may further be connected via a third DECT connection. The disclosed headset system is thus simultaneously connectable to three different telecommunication devices, namely the desk phone, the PC and the mobile phone. The user can accept, reject and initiate calls via respective user interfaces provided on the headset and on the headset base unit. Similar considerations apply to a wireless headset connected to a base station.

PCT patent application WO 2013/087099 discloses a similar headset system wherein the touch-screen display of the headset base unit is replaced by a device holder in which a mobile communication device can be placed and used for controlling the telecommunication devices via the headset base unit.

The above patent applications do not disclose means for handling a number of ambiguous and/or conflict situations that can occur in daily use of the headset systems, in particular when they are used together with mobile phones or other mobile telecommunication devices that can be easily taken outside the wireless ranges of the headsets and/or the headset base units. Examples of such situations will become clear from the following description of the present invention.

DISCLOSURE OF INVENTION

It is an object of the present invention to provide a desktop telephone system that does not suffer from the disadvantages of prior art desktop telephone systems. It is a further object of the present invention to provide a method for operating a desktop telephone system that does not suffer from the disadvantages of prior art methods.

These and other objects of the invention are achieved by the invention defined in the independent claims and further explained in the following description. Further objects of the invention are achieved by embodiments defined in the dependent claims and in the detailed description of the invention.

Within this document, the term "desktop telephone system" refers to a system that is connectable to one or more telephone networks, that is suitable for conducting telephone conversations with one or more remote parties through one or more telephone networks and that comprises one or more devices capable of providing a user interface during telephone conversations and suitable for placement and operation on a desktop. A desktop telephone system thus comprises one or more devices having a user interface that allows a user to accept incoming telephone calls and/or to initiate outgoing telephone calls as well as one or more sound interface devices that can provide a sound input interface and/or a sound output interface during telephone conversations. A desktop telephone system may be adapted to allow a user to use different sound interface devices during one and the same telephone conversation, e.g. by transmitting sound to the user through a desktop loudspeaker device and receiving sound from the user through a portable wireless microphone device.

A desktop telephone system may comprise portable devices and/or stationary or semi-stationary devices. The term "stationary device" refers to a device intended to be installed in a fixed position during use and to remain in the installed position between uses. Examples of devices that may fall within this definition include desktop computers, desktop telephones, base units for wireless telephones, base units for wired or wireless headsets, telephone switch boards etc. The term "semi-stationary device" refers to a portable device that may be arranged in a fixed position during use and that may easily be removed from the fixed position during use and/or between uses. Examples of devices that may fall within this definition include e.g. laptop and tablet computers, mobile or cell phones, smartphones, personal digital assistants, wireless telephones and speakerphones. A desktop telephone system may comprise one or more docking stations and/or desktop holders for receiving semi-stationary devices and retain these in a fixed position.

The term "telephone network" refers to a public or non-public network allowing voice communication between arbitrary pairs or groups of parties connected to the network. Examples of telephone networks that may fall within this definition include public telephone networks, such as e.g. PSTN, ISDN networks, GSM cell phone networks, UMTS cell-phone networks, satellite telephony networks and Internet IP Telephony networks, as well as non-public networks, such as e.g. company-wide or community-wide analog telephone networks, wireless telephone networks, IP Telephony networks and networks based on WebRTC, which is a software interface that allows voice communication between parties through the internet and internet browsers.

The term "sound interface" refers to an interface suitable for transmitting a sound signal to a user in dependence on an audio output signal and/or for providing an audio input signal in dependence on a voice sound received from a user. The term "sound interface device" refers to an audio device that can provide a sound interface. A sound interface device thus comprises a sound transmitter and/or a sound receiver. A sound transmitter preferably comprises one or more sound output transducers for providing said sound signal in dependence on said audio output signal. A sound receiver preferably comprises one or more input transducers for providing said audio input signal in dependence on said received voice sound. Examples of suitable output sound transducers include loudspeaker drivers and vibrators based on e.g. electrodynamic, electromagnetic, electrostatic, piezoelectric and/or thermoelectric principles. Examples of suitable input sound transducers include microphones and vibration sensors based on e.g. electrodynamic, electromagnetic, electrostatic, piezoelectric, thermoelectric and/or optical principles. Examples of sound interface devices include desktop, laptop and tablet computers, desktop telephones, mobile or cell phones, smartphones, personal digital assistants, base units, wireless telephones, wired and wireless handsets, wired and wireless headsets, loudspeaker devices, wired or wireless microphone devices and speakerphones. Sound interface devices are sometimes referred to as "audio endpoints", e.g. in connection with systems and software providing telephony services through personal computers and smartphones The term "telephone gateway" refers to a device capable of functioning as an interface between a telephone network and one or more sound interface devices. A telephone gateway thus comprises a converter for converting telephone signals received from the telephone network into audio and/or control signals that may be provided to one or more sound interface devices and/or a converter for converting audio and/or control signals received from one or more sound interface devices into telephone signals that may be provided to the telephone network. A telephone gateway may further comprise a signaling controller adapted to exchange control signals with the telephone network in order to receive, maintain, reject, terminate and/or initiate telephone calls through the telephone network. The signaling controller may preferably perform the exchange of control signals with the telephone network such that the telephone gateway can relieve a connected sound interface device of at least a portion of the control signaling required by the telephone network. Thus, a connected sound interface device may be used in telephone conversations although it is only capable of handling a subset—or none at all—of the control signals of the telephone network. Examples of devices comprising or constituting a telephone gateway that may fall within this definition include desktop, laptop and tablet computers, desktop telephones, mobile or cell phones, smartphones, personal digital assistants, base units for wireless telephones, base units for wired or wireless headsets, telephone devices embodied as headsets or handsets, telephone switch boards etc.

The term "telephone device" refers to a device comprising at least one telephone gateway and at least one sound interface device connected to the at least one telephone gateway. The at least one telephone gateway and the at least one sound interface device may be arranged within a common housing, such as in a conventional desktop telephone or in a conventional mobile phone, or some or all of the devices may be arranged within separate housings, such as in a conventional DECT wireless telephone with separate handset and base unit.

Telephone gateways and sound interface devices may be interconnected by wires or by wireless connections, such as e.g. radio frequency connections and/or optical connections.

The terms "sound" and "sound signal" refer to signals propagating in media by means of pressure variations. The term "audio signal" refers to a signal directly or indirectly derived from a sound signal and/or intended to be directly or indirectly transformed into a sound signal. An audio signal may itself be a sound signal. An audio signal may constitute or comprise an arbitrary representation of a sound signal, such as e.g. an electric signal, an optical signal, a radio frequency signal, an inductive signal, a capacitive signal or an ultrasound signal, and the signal may be represented or encoded e.g. as an analog signal, a digital signal, a modulated signal etc. The term "audio connection" refers to a wired or wireless connection suitable for transmitting one or more audio signals.

The term "transmission channel" refers to a combination of a transmission medium, such as e.g. one or more electric conductors, wires or leads, one or more electromagnetic wave guides, one or more optical conductors or wave guides, one or more acoustic conductors or wave guides and/or one or more spaces in which electrostatic, electromagnetic, magnetic and/or acoustic waves or fields can propagate, and a set of rules governing the transmission of information through the transmission medium. Information is transmitted in the form of one or more signals. A device may provide a signal to or through a transmission channel by transmitting the signal into the transmission medium by means of a transmitter connected to the transmission medium. A device may receive a signal from a transmission channel by means of a receiver connected to the transmission medium. One or more transmitters and/or one or more receivers may be connected to a transmission medium. A transmitter or a receiver—or a transceiver combining both—may be connected to a transmission medium by any known type of signal coupling, such as e.g. electrically conductive, capacitive, magnetic, electromagnetic, optical, acoustic and/or mechanical coupling. Preferably, one or more devices may be adapted to act as channel master, i.e. to control other device's access to the transmission channel by transmitting one or more channel control signals to other devices, thereby controlling whether, when and/or how other devices may transmit to and/or receive from the transmission channel. Preferably, at most one device at a time acts as channel master on the transmission channel. Alternatively, access to the transmission channel may be controlled cooperatively by two or more devices exchanging channel control signals with each other.

A communication protocol may define any combination of one or more transmission media and one or more transmission rule sets. A transmission rule set may preferably allow multiple transmission channels to coexist on one and the same transmission medium and may thus define constraints on signals transmitted into the transmission medium and/or constraints on transmitters, receivers and transceivers to be connected to the transmission medium.

Furthermore, one and the same transmission rule may be used for transmission of information through different transmission media. Transmission channels coexisting on a shared transmission medium may be separated e.g. by physical distance such that signals transmitted on one transmission channel reaches receivers on another transmission channel on the shared transmission medium with relatively low signal level, by frequency division, i.e. by using different signal frequencies or frequency ranges, by time division, i.e. by transmitting at different times or within different time slots, by using different frequency hopping schemes and/or by using different signal encoding. Allocation of frequencies, frequency ranges, transmission times, time slots, frequency hopping schemes and/or encoding to a transmission channel may be static or dynamic. In the latter case, the channel allocation may e.g. be negotiated among devices sharing the respective transmission medium and/or determined by one of these devices. Preferably, channel allocation for a transmission channel may be negotiated and/or determined by a device that acts as channel master for that particular transmission channel.

Within this document, the singular forms "a", "an", and the are intended to include the plural forms as well (i.e. to have the meaning "at least one"), unless expressly stated otherwise. Likewise, the term "any" is intended to include both the singular and the plural form, unless expressly stated otherwise. Correspondingly, the terms "has", "includes", "comprises", "having", "including" and "comprising" specify the presence of respective features, operations, elements and/or components, but do not preclude the presence or addition of further entities. The term "and/or" generally includes any possible combination of one or more of the associated items. The steps or operations of any method disclosed herein need not be performed in the exact order disclosed, unless expressly stated otherwise.

Furthermore, when an element or entity is referred to as being "connected" or "coupled" to another element or entity, this includes direct connection (or coupling) as well as connection (or coupling) via intervening elements or entities, unless expressly stated otherwise. Also, unless expressly stated otherwise, when a signal is referred to as being "provided" by a first entity to a second entity, this includes directly or indirectly transmitting the signal in its original form as well as any direct or indirect transmission that modifies the original signal and/or converts the signal into another domain and/or representation before it arrives at the second entity, provided that the information comprised by the signal received by the second entity is sufficient for the second entity to perform the specified actions with respect to the signal.

Ordinal attributes like "first", "second", "primary", "secondary", "main" and "auxiliary" are intended to allow distinguishing between different entities, and should not be construed as implying any order, hierarchy, dependency or precedency unless expressly stated otherwise.

BRIEF DESCRIPTION OF THE DRAWINGS

The invention will be explained in more detail below in connection with preferred embodiments and with reference to the drawings in which.

The figures are schematic and simplified for clarity, and they just show details essential to understanding the invention, while other details may be left out. Where practical, like reference numerals and/or literal identifiers are used for identical or corresponding parts.

MODE(S) FOR CARRYING OUT THE INVENTION

Figure 1:
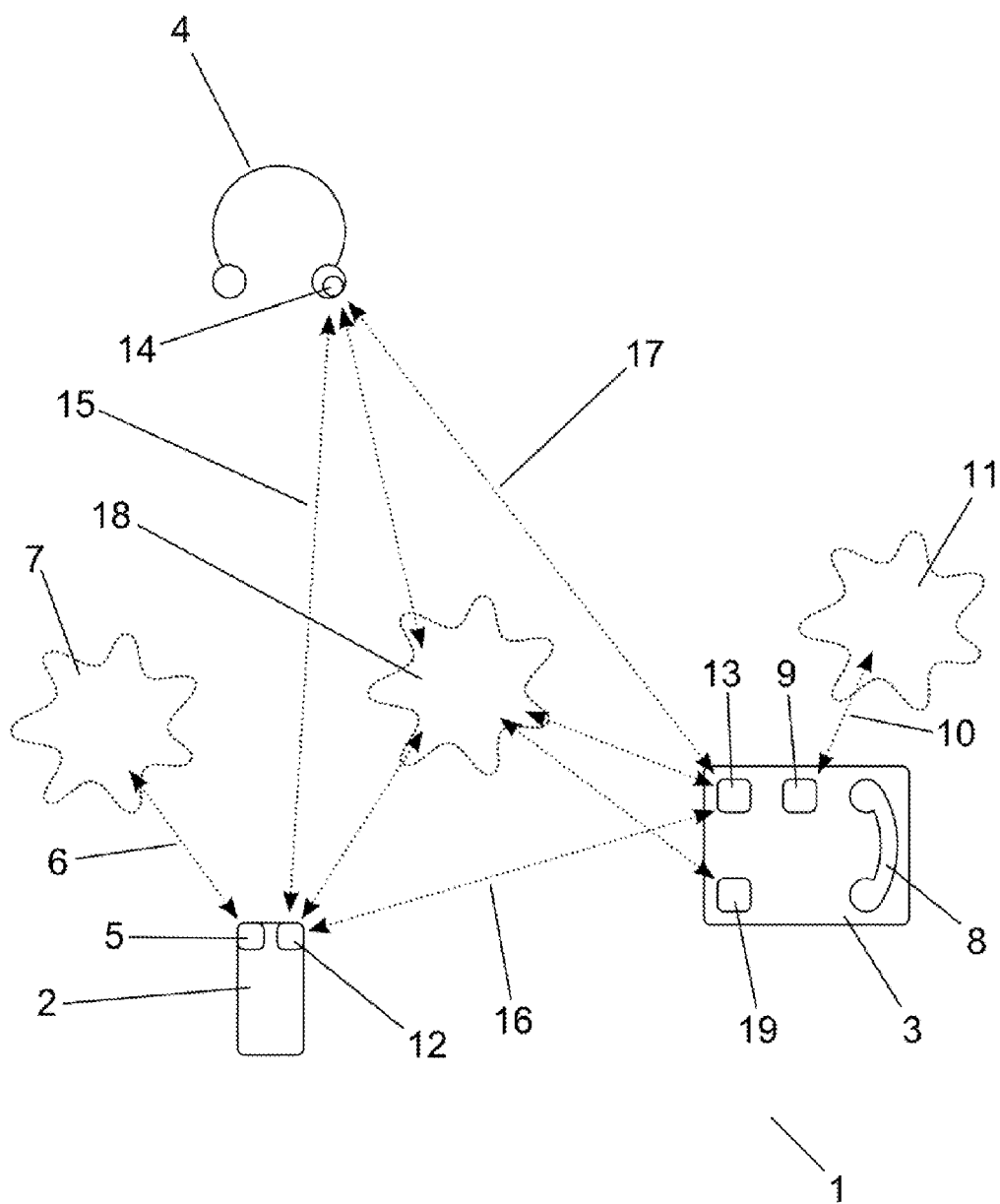
FIG. 1 shows a first embodiment of a desktop telephone system according to the invention.

The desktop telephone system 1 shown in FIG. 1 comprises a mobile phone 2, a desktop telephone 3 and a wireless headset 4. The mobile phone 2 comprises a wireless transceiver 5 adapted to establish a wireless telephone connection 6 to a mobile phone network 7. The desktop telephone 3 comprises a handset 8 and a telephone transceiver 9 adapted to establish a wired telephone connection 10 to a landline telephone network 11, such as e.g. a PSTN. Each of the mobile phone 2, the desktop telephone 3 and the wireless headset 4 comprises a respective wireless audio transceiver 12, 13, 14 adapted to establish a wireless audio connection 15, 16, 17 to each of the respective two other devices 2, 3, 4. Each of the mobile phone 2, the desktop telephone 3 and the wireless headset 4 is further connected to a wireless control network 18, and the desktop telephone 3 further comprises a control device 19 connected to the wireless control network 18.

Each of the mobile phone 2, the wireless headset 4 and the handset 8 (and thus the desktop telephone 3) comprises a speaker driver (not shown) and a microphone (not shown) which enable each of the respective sound interface devices 2, 3, 4, 8 to provide a sound output interface and a sound input interface to a user during telephone conversations.

The mobile phone 2 and the wireless headset 4 are adapted to allow the user to use the sound interface of the wireless headset 4 during telephone conversations through the wireless audio connection 15, the mobile phone 2, the wireless telephone connection 6 and the mobile phone network 7. The mobile phone 2 thereby functions as a telephone gateway between the mobile phone network 7 and the wireless headset 4. The mobile phone 2 and the desktop telephone 3 are adapted to allow the user to alternatively use the sound interface of the handset 8 during telephone conversations through the wireless audio connection 16, the mobile phone 2, the wireless telephone connection 6 and the mobile phone network 7. The mobile phone 2 thereby functions as a telephone gateway between the mobile phone network 7 and the desktop telephone 3.

The desktop telephone 3 is further adapted to allow the user to use the sound interface of the handset 8 during telephone conversations through the wired telephone connection 10 and the landline telephone network 11. The desktop telephone 3 (or a portion hereof) thus functions as a telephone gateway between the landline telephone network 11 and the handset 8. The landline telephone network 11 and the handset 8 may exchange audio signals through the telephone transceiver 9 and an audio connection (44, see FIG. 4) internal to the desktop telephone 3. The desktop telephone 3 and the wireless headset 4 are adapted to allow the user to alternatively use the sound interface of the wireless headset 4 during telephone conversations. The landline telephone network 11 and the wireless headset 4 may exchange audio signals through the wired telephone connection 10, the telephone transceiver 9, an audio connection (47, see FIG. 4) internal to the desktop telephone 3 and the wireless audio connection 17. The desktop telephone 3 thereby functions as a telephone gateway between the landline telephone network 11 and the wireless headset 4.

Each of the mobile phone 2 and the desktop telephone 3 may thus function as a telephone gateway between the respective telephone network 7, 11 and each of the sound interface devices 2, 3, 4, 8. This allows the user to select a momentarily preferred sound interface device 2, 3, 4, 8 for conducting a telephone conversation, regardless of which gateway device 2, 3 and which telephone network 7, 11 the telephone call is routed through. Prior art desktop telephone systems in general require execution of complicated configuration or connection procedures in order to achieve similar flexibility in use of the systems. The desktop telephone system 1 avoids this by having the control device 19 utilize the wireless control network 18 to control the establishing of audio connections 15, 16, 17, 44, 47 when the user accepts an incoming telephone call as will be explained in further detail in the following.

In general, one or more gateway devices 2, 3 and one or more sound interface devices 2, 3, 4, 8 are each adapted to provide one or more system control signals to the wireless control network 18, and one or more control devices 19 are each adapted to receive one or more system control signals from the wireless control network 18 and to cause the desktop telephone system 1 to establish at least one audio connection 15, 16, 17, 44, 47 between a gateway device 2, 3 and a sound interface 3, 4, 8 in dependence on received system control signals. Preferably, one or more of the audio connections 15, 16, 17, 44, 47 are wireless. One or more control devices 19 may preferably each be adapted to provide one or more system control signals to the wireless control network 18, and one or more gateway devices 2, 3 and/or one or more sound interface devices 2, 3, 4, 8 may preferably each be adapted to establish an audio connection 15, 16, 17, 44, 47 in response to receiving one or more predefined system control signals from the wireless control network 18. The desktop telephone system 1 may comprise one or more further devices each adapted to provide one or more system control signals to the wireless control network 18 and/or to receive one or more system control signals from the wireless control network 18.

The desktop telephone system 1 may comprise one or more gateway devices 2, 3, one or more sound interface devices 2, 3, 4, 8, one or more control devices 19 and/or one or more further devices that provide one or more system control signals to any other of the devices 2, 3, 4, 8, 19, 66 bypassing the wireless control network 18, e.g. in the case that the providing device 2, 3, 4, 8, 19, 66 and the recipient device 2, 3, 4, 8, 19, 66 are arranged within one and the same housing. Each of such recipient devices 2, 3, 4, 8, 19, 66 is preferably adapted to react to such bypassed system control signals in the same way as to those received through the wireless control network 18, except if expressly stated otherwise. In the following, the phrase "preferably through the wireless control network 18" is used to indicate that the specified signal or signals may preferably be provided through the wireless control network 18 where this makes sense, e.g. if the specified signal or signals can be used meaningfully by a recipient device 2, 3, 4, 8, 19, 66 which is arranged in a housing mechanically separate from the providing device 2, 3, 4, 8, 19, 66, and may alternatively bypass the wireless control network 18 where this makes sense, e.g. if the specified signal or signals can be used meaningfully by only one recipient device 2, 3, 4, 8, 19, 66 which is arranged in the same housing as the providing device 2, 3, 4, 8, 19, 66. Preferably, at least one gateway device 2, 3, such as e.g. at least two or at least three gateway devices 2, 3, each provides one or more system control signals to the wireless control network 18. Preferably, at least one sound interface device 2, 3, 4, 8, such as e.g. at least two or at least three sound interface devices 2, 3, 4, 8, each provides one or more system control signals to the wireless control network 18. Preferably, at least one control device 19, such as e.g. at least two or at least three control devices 19, each provides one or more system control signals to the wireless control network 18.

One or more gateway devices 2, 3 may each be adapted to provide one or more system control signals that may e.g. indicate the current status of a respective telephone connection 6, 10 and/or a connected telephone network 7, 11. A gateway device 2, 3 may thus provide e.g. a call announcement signal indicating that an incoming telephone call from a telephone network 7, 11 is pending, a call cancelled signal (24, see FIG. 2) indicating that an incoming or outgoing telephone call has been cancelled or rejected, a call established signal indicating that a telephone conversation has been established, a call ended signal indicating that an ongoing telephone conversation has been terminated, a network available signal indicating that the telephone connection 6, 10 to the respective telephone network 7, 11 is operational and/or a network lost signal indicating that the telephone connection 6, 10 to the respective telephone network 7, 11 is not operational.

One or more devices having a user interface, such as e.g. gateway devices 2, 3, sound interface devices 2, 3, 4, 8 and/or user interface devices (66, see FIG. 6), may each be adapted to provide one or more system control signals that may e.g. indicate a user command. A device 2, 3, 4, 8, 66 having a user interface may thus provide e.g. a user accept signal indicating a user command to accept an incoming call, a user reject signal indicating a user command to reject an incoming call, a user hang-up signal indicating a user command to terminate an ongoing telephone conversation, a user recall signal indicating a user command to reconnect to a remote party earlier connected to—for instance in the latest telephone conversation, a user call signal indicating a user command to initiate a telephone call to an indicated remote party, a user redirect signal indicating a user command to redirect a telephone call or an ongoing telephone conversation, e.g. by transferring the telephone call or the ongoing telephone conversation to another telephone network 7, 11, and/or a user configuration signal indicating a user command to change the configuration of the desktop telephone system 1.

One or more control devices 19 may each be adapted provide one or more system control signals indicating a system command, such as e.g. a system accept signal indicating a system command to accept an incoming call, a system reject signal indicating a system command to reject an incoming call, a system hang-up signal indicating a system command to terminate an ongoing telephone conversation, a system recall signal indicating a system command to reconnect to a remote party earlier connected to—for instance in the latest telephone conversation, a system call signal indicating a system command to initiate a telephone call to an indicated remote party, a system redirect signal indicating a system command to redirect a telephone call or an ongoing telephone conversation, e.g. by transferring the telephone call or the ongoing telephone conversation to another telephone network 7, 11, an audio connect signal indicating a system command to establish an audio connection 15, 16, 17, 44, 47, an audio disconnect signal indicating a system command to release one or more audio connections 15, 16, 17, 44, 47, a call alert signal indicating a system commando to have a recipient device 2, 3, 4, 8, 66 alert the user about an incoming telephone call, a pick-up alert signal indicating a system commando to have a recipient device 2, 3, 4, 8, 66 alert the user about the possibility to use a specified sound interface device 2, 3, 4, 8 in—and optionally take over—an ongoing telephone conversation and/or a device alert signal indicating a system commando to have a recipient device 2, 3, 4, 8, 66 alert the user about a new device discovered on the wireless control network 18.

One or more system control signals preferably each comprises information, such as a sender id that allows a recipient device 2, 3, 4, 8, 19, 66 to identify the source 2, 3, 4, 8, 19, 66 of the system control signal and/or a recipient id that allows a recipient device 2, 3, 4, 8, 19, 66 to identify itself as intended recipient of the system control signal. Any system control signal indicating a user command may preferably comprise information, such as e.g. an indication of the user command itself and/or of the user action that was detected, and/or a corresponding device command that allows a recipient device 2, 3, 4, 8, 19, 66 to identify one or more operations to be performed in response to receiving the system control signal. Any system control signal indicating a user command and/or system command to establish or redirect a telephone conversation and/or to establish and/or release an audio connection 15, 16, 17, 44, 47, such as e.g. a user accept signal, a user recall signal, a user call signal, a user redirect signal, a system accept signal, a system recall signal, a system call signal, a system redirect signal, an audio connect signal and/or an audio disconnect signal preferably comprises information, such as one or more device IDs and/or an audio connection id, that allows a recipient 2, 3, 4, 8, 19, 66 to identify which sound interface device 2, 3, 4, 8 to connect a gateway device 2, 3 to and/or which audio connections 15, 16, 17, 44, 47 to establish or release.

Note that a recipient 2, 3, 4, 8, 19, 66 may in some cases interpret a system control device in another way than intended by the provider 2, 3, 4, 8, 19, 66. For instance, a gateway device 2, 3 may in some cases interpret an audio connect signal as a system accept signal and thus accept an incoming call in response thereto.

Figure 2:
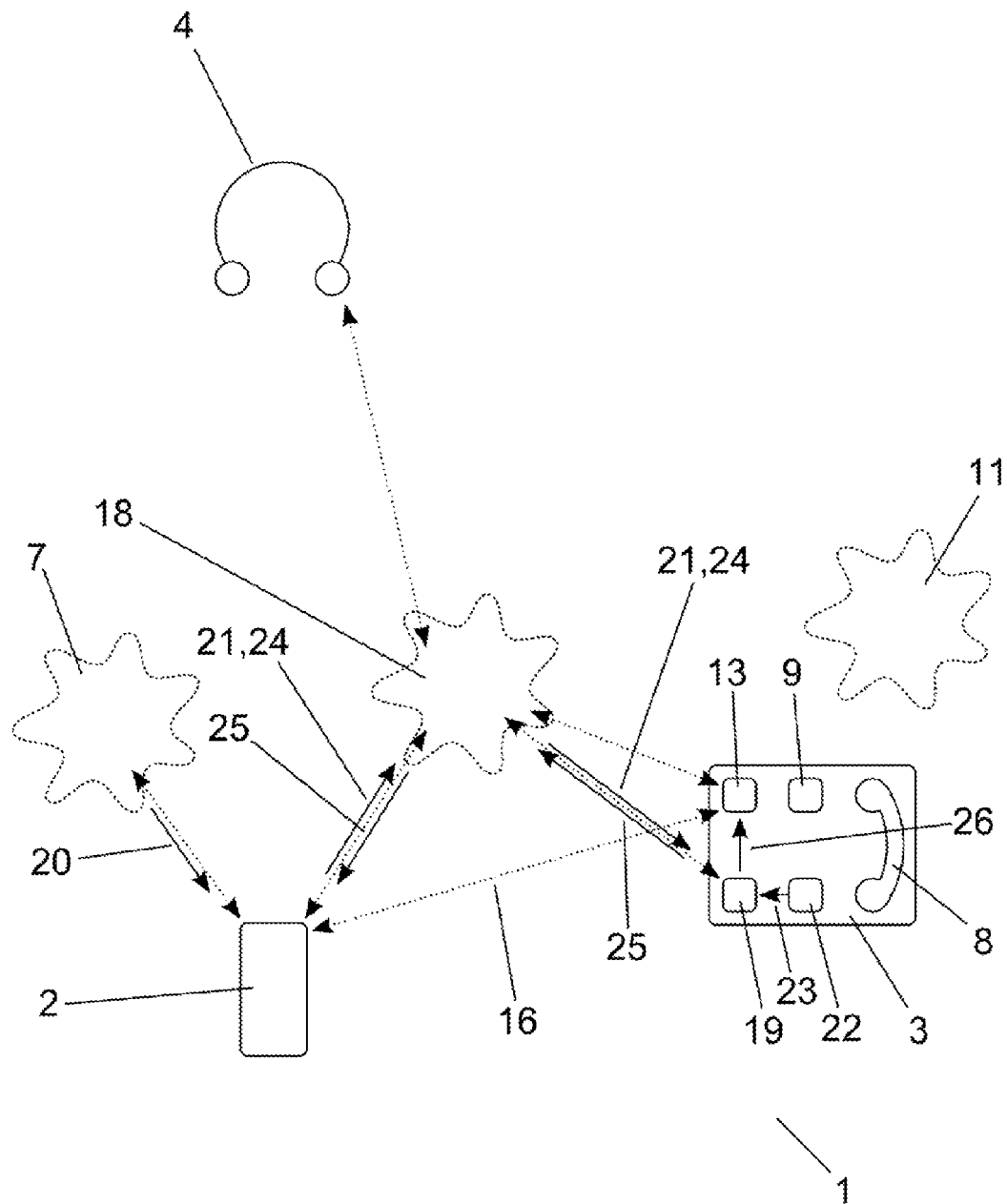
FIG. 2 illustrates the functioning of the desktop telephone system of FIG. 1 in a first scenario.

In a first scenario shown in FIG. 2, a remote party (not shown) initiates a telephone call through the mobile phone network 7, which signals the incoming call 20 to the mobile phone 2 through the wireless telephone connection 6. In response hereto, the mobile phone 2 provides a call announcement signal 21 to the wireless control network 18. Preferably, the mobile phone 2 also alerts the user about the incoming call 20 by means of visual, acoustic and/or tactile signals. The control device 19 comprised by the desktop telephone 3 receives the call announcement signal 21 from the wireless control network 18 and determines that the call announcement signal 21 was provided by the mobile phone 2. In the shown desktop telephone system 1, this determination may be based on static information, such as e.g. that the mobile phone 2 could be the only gateway device in the desktop telephone system 1 capable of providing a call announcement signal 21 through the wireless control network 18. Alternatively, or additionally, the determination may be based on information comprised by the call announcement signal 21, such as e.g. a sender id.

After being alerted, the user picks up the handset 8 from the desktop telephone 3. An action detector 22 comprised by the desktop telephone 3 detects this user action as an accept action, i.e. determines that the user action indicates a user command to accept the incoming call 20, and in response hereto provides a user accept signal 23 to the control device 19 bypassing the wireless control network 18. The control device 19 receives the user accept signal 23 from the action detector 22 and determines that the user accept signal 23 was provided by the desktop telephone 3. In the shown desktop telephone system 1, this determination may e.g. be based on static information, such as e.g. that the desktop telephone 3 or the handset 8 could be the only sound interface device capable of providing a user accept signal 23 to the control device 19 bypassing the wireless control network 18, and/or on e.g. a sender id comprised by the user accept signal 23.

Having received the call announcement signal 21 from the mobile phone 2 and the user accept signal 23 from the action detector 22, the control device 19 determines whether the received call announcement signal 21 and the received user accept signal 23 are related to one and the same incoming call 20. This determination may be based on e.g. a time difference between receiving the signals 21, 23, the order of receiving the signals 21, 23 and/or any other suitable relationship between the signals 21, 23 and/or their contents. The determination may further be based on a relationship of one or both of the call announcement signal 21 and the user accept signal 23 to one or more further system control signals, such as e.g. a further call announcement signal 21, a further user accept signal 23, a call cancelled signal 24 or a call ended signal. The control device 19 may e.g. determine that a user accept signal 23 is unrelated to a previous call announcement signal 21 if the control device 19 in the meantime has received a further call announcement signal 21 or a call cancelled signal 24 or a call ended signal related to the previous call announcement signal 21. In this case, the control device 19 may interpret the received user accept signal 23 as indicating another user command, such as e.g. a user command to join the picked-up sound interface device 2, 3 4, 8 to an ongoing telephone conversation.

In response to having determined that the received call announcement signal 21 and the received user accept signal 23 are related to the same incoming call 20, the control device 19 causes the mobile phone 2 and/or the desktop telephone 3 to establish the wireless audio connection 16 in order to allow the exchange of audio signals between the mobile phone 2 and the handset 8 during the telephone conversation. The control device 19 may e.g. provide an audio connect signal 25 to the wireless control network 18, and the mobile phone 2 may receive the audio connect signal 25 from the wireless control network 18 and initiate a connection procedure with the desktop telephone 3 to establish the wireless audio connection 16. Alternatively or additionally, the control device 19 may e.g. provide an audio connect signal 26 to the wireless audio transceiver 13 of the desktop telephone 3, which may receive the audio connect signal 26 and initiate a connection procedure with the mobile phone 2 to establish the wireless audio connection 16. The control device 19 may provide the audio connect signal 26 to the wireless audio transceiver 13 bypassing the wireless control network 18, or, alternatively, through the wireless control network 18. One or more of the audio connect signals 25, 26 may preferably comprise information indicating which gateway device 2, 3 and/or which sound interface device 2, 3, 4, 8 to connect through the wireless audio connection 16. The mobile phone 2 preferably accepts the incoming call 20 from the mobile phone network 7 in response to receiving the user accept signal 23 and/or the audio connect signal 25 from the wireless control network 18 and thus establishes a telephone conversation through the mobile phone network 7, the mobile phone 2 and the handset 8. Alternatively, the control device 19 may cause the mobile phone 2 to accept the incoming call 20 by providing a system accept signal to the mobile phone 2 through the wireless control network 18 in response to having determined that the received call announcement signal 21 and the received user accept signal 23 are related to the same incoming call 20, and the mobile phone 2 may accept the incoming call 20 in response to receiving the system accept signal.

Figure 3:
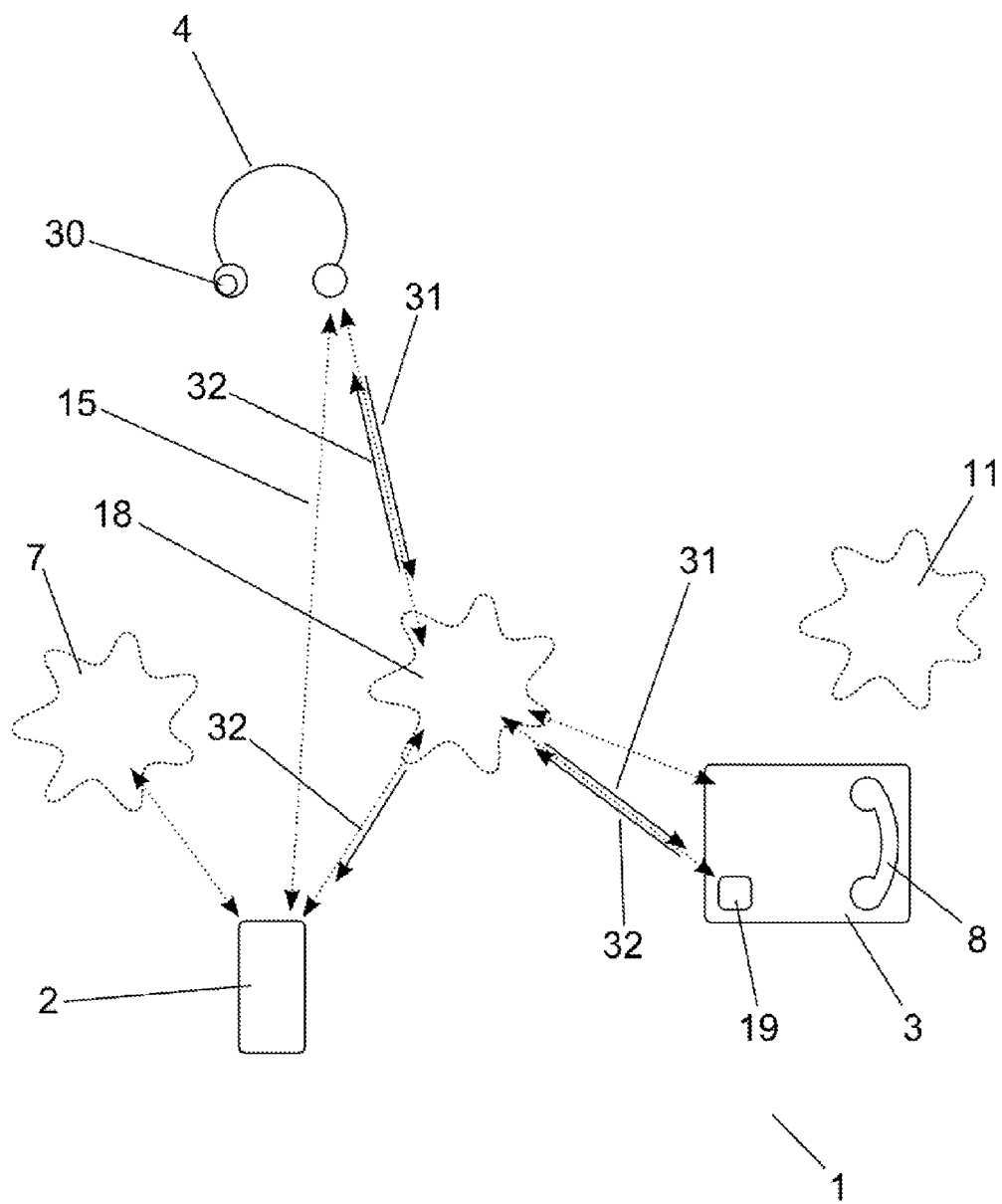
FIG. 3 illustrates the functioning of the desktop telephone system of FIG. 1 in a second scenario.

FIG. 3 shows, as a variant of the first scenario, a second scenario in which the user picks up the wireless headset 4 instead of the handset 8. An action detector 30 comprised by the wireless headset 4 detects this user action as an accept action and in response hereto provides a user accept signal 31 to the wireless control network 18. The control device 19 receives the user accept signal 31 from the wireless control network 18 and determines that the user accept signal 31 was provided by the wireless headset 4. In the shown desktop telephone system 1, this determination may be based on static information, such as e.g. that the wireless headset 4 could be the only sound interface device of the desktop telephone system 1 that is capable of providing a user accept signal 31 to the control device 19 through the wireless control network 18, and/or on e.g. a sender id comprised by the user accept signal 31.

Having received the call announcement signal 21 from the mobile phone 2 and the user accept signal 31 from the wireless headset 4, the control device 19 determines whether the received call announcement signal 21 and the received user accept signal 31 are related to one and the same incoming call 20 as described above. In response to having determined that the received call announcement signal 21 and the received user accept signal 31 are related to the same incoming call, the control device 19 causes the mobile phone 2 and/or the wireless headset 4 to establish the wireless audio connection 15 in order to allow the exchange of audio signals between the mobile phone 2 and the wireless headset 4 during the telephone conversation. The control device 19 may e.g. provide an audio connect signal 32 to the wireless control network 18, and the mobile phone 2 may receive the audio connect signal 32 from the wireless control network 18 and initiate a connection procedure with the wireless headset 4 to establish the wireless audio connection 15. Alternatively or additionally, the wireless headset 4 may receive the audio connect signal 32 from the wireless control network 18 and initiate a connection procedure with the mobile phone 2 to establish the wireless audio connection 15. The control device 19 may provide multiple audio connect signals 32 to the wireless control network 18, and the mobile phone 2 and the wireless headset 4 may be adapted to react to individual subsets of the multiple audio connect signals 32. The audio connect signal 32 or audio connect signals 32 may preferably comprise information indicating which gateway device 2, 3 and/or which sound interface device 2, 3, 4, 8 to connect through the wireless audio connection 15.

In any of the two scenarios described above, the user may initially, i.e. after being alerted about the incoming telephone call 20 and before performing other user actions, perform an accept action that indicates a user command to use the sound interface of the mobile phone 2 for conducting the corresponding telephone conversation. The accept action may be detected directly through the user interface of the mobile phone 2 or through a user interface of another device 3, 4, 8, 66 and indicated to the mobile phone 2 by a user accept signal provided to the wireless control network 18, optionally relayed by the control device 19. In this case and in response to detecting the initial accept action, the mobile phone 2 preferably accepts the incoming call 20 from the mobile phone network 7 and thus establishes a telephone conversation through the mobile phone network 7 and the mobile phone 2 in already known way.

Furthermore, the mobile phone 2 preferably provides a user accept signal (not shown) and/or a call established signal (not shown) to the wireless control network 18 in order to inform the control device 19 of the ongoing telephone conversation in response to detecting the accept action and/or in response to detecting establishing of the telephone conversation. When the user subsequently picks up the wireless headset 4 or the handset 8, the control device 19 may preferably determine the corresponding user accept signal 23, 31 to be related to the ongoing telephone conversation and thus provide a respective audio connect signal 25, 26, 32 to the wireless control network 18. In response to receiving the audio connect signal 25, 26, 32, the mobile phone 2, the wireless headset 4 and/or the desktop telephone 3 may initiate a connection procedure to establish a wireless audio connection 15, 16 between the mobile phone 2 and the picked-up sound interface device 4, 8, and the mobile phone 2 may subsequently proceed using the respective sound interface device 4, 8 as described in the respective scenario above. The mobile phone 2 may preferably further disable its own sound interface, either by itself or in response to receiving a corresponding audio disconnect signal from the control device 19.

If the user subsequently picks up another one of the wireless headset 4 and the handset 8, the control device 19 may preferably again determine the corresponding user accept signal 23, 31 to be related to the ongoing telephone conversation and thus provide a respective audio connect signal 25, 26, 32 to the wireless control network 18. In response to receiving the audio connect signal 25, 26, 32, the mobile phone 2, the wireless headset 4 and/or the desktop telephone 3 may initiate a connection procedure to establish a wireless audio connection 15, 16 between the mobile phone 2 and the picked-up sound interface device 4, 8, and the mobile phone 2 may subsequently proceed using the respective sound interface device 4, 8 as described in the respective scenario above. The mobile phone 2, the wireless headset 4 and/or the desktop telephone 3 may preferably release the previously established wireless audio connection 15, 16.

Thus, generally, the control device 19 may be adapted to determine whether a user accept signal 23, 31 is related to an ongoing telephone conversation and if so, to cause the gateway device 2, 3 serving as telephone gateway for the ongoing telephone conversation and/or the sound interface device 4, 8 providing the user accept signal 23, 31 to establish a wireless audio connection 15, 16, 17 and thus allow the exchange of audio signals between the gateway device 2, 3 and the sound interface device 4, 8 during the telephone conversation. The control device 19 may e.g. provide a further audio connect signal 25, 26, 32 to the wireless control network 18, and the gateway device 2, 3 and/or the sound interface device 4, 8 may receive the audio connect signal 25, 26, 32 from the wireless control network 18 and initiate a connection procedure with the respective other device 2, 3, 4, 8 to establish a wireless audio connection 15, 16, 17. The desktop telephone system 1 may thus allow the user to freely switch between sound interface devices 2, 3, 4, 8 and/or to add and/or remove individual sound interface devices 2, 3, 4, 8 during a telephone conversation. The desktop telephone system 1 may for instance allow the user to use the wireless headset 4 and a speakerphone (not shown) for simultaneously providing sound signals during a telephone conversation, preferably in dependence on one and the same audio signal received from the telephone network 7, 11, e.g. when being in a meeting with other persons present at the local end. The control device 19 may refrain from providing a further audio connect signal 25, 26, 32 if it determines that the user accept signal 23, 31 was provided by a sound interface device 2, 3, 4, 8 already registered as being used in an ongoing telephone conversation. The control device 19 and/or the gateway device 2, 3 may further terminate the ongoing telephone conversation in response to determining that the gateway device 2, 3 does not have any active audio connections 15, 16, 17, 44, 47.

Preferably, one or more sound interface devices 2, 3, 4, 8 are adapted to alert the user about the possibility to use the respective sound interface devices 2, 3, 4, 8 in an ongoing telephone conversation, preferably by means of visual, acoustic and/or tactile signals that are distinguishable by the user from signals used to alert the user about an incoming call 20. Preferably, the control device 19 may be adapted to provide one or more pick-up alert signals (not shown) to the wireless control network 18 each indicating one or more sound interface devices 2, 3, 4, 8 that may be used in the currently ongoing telephone conversation, and one or more sound interface devices 2, 3, 4, 8 may be adapted to alert the user in response to receiving one or more pick-up alert signals.

Figure 4:
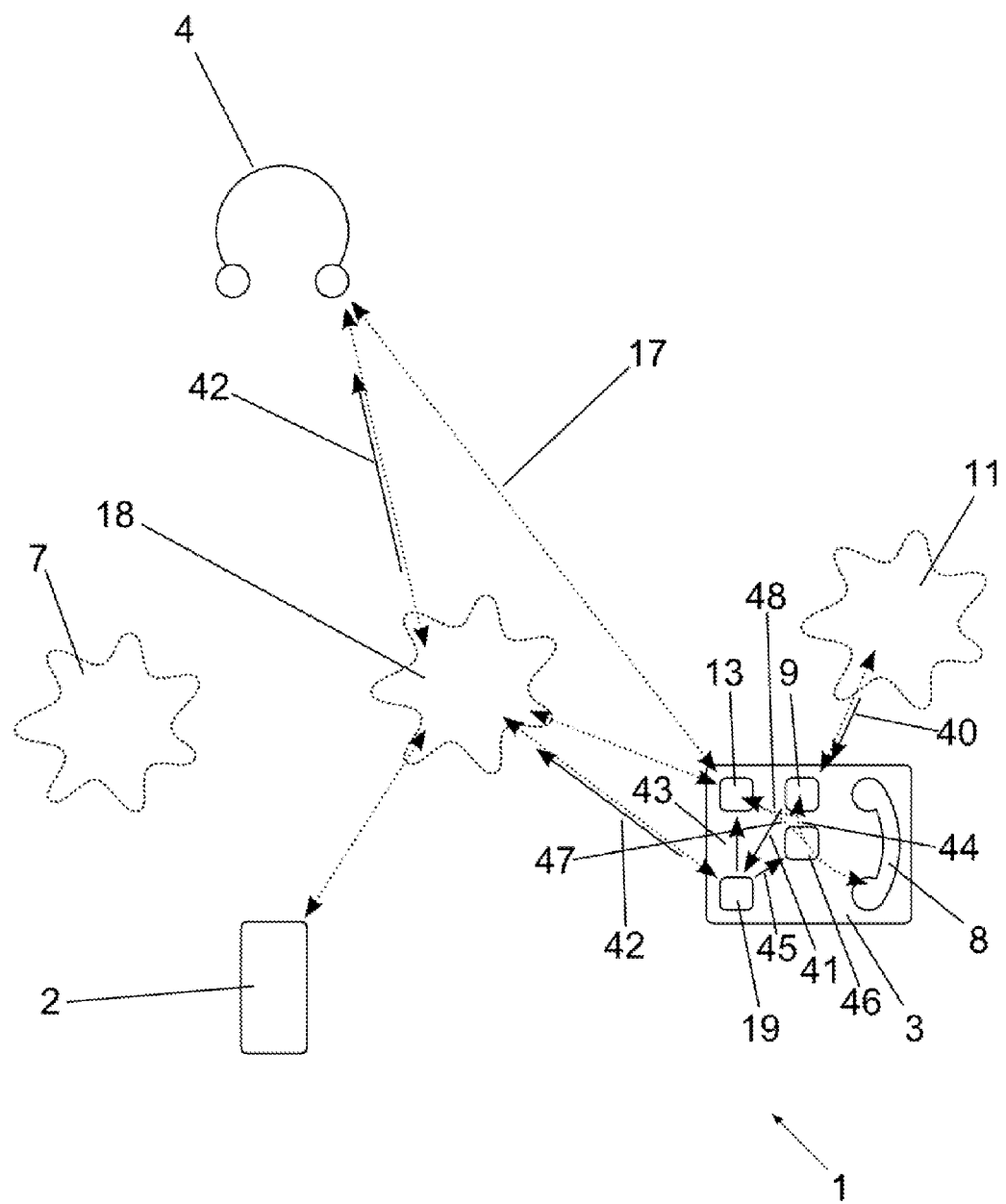
FIG. 4 illustrates the functioning of the desktop telephone system of FIG. 1 in a third scenario.

FIG. 4 shows a third scenario in which a remote party initiates a telephone call through the landline telephone network 11, which signals the incoming call 40 to the desktop telephone 3 through the wired telephone connection 10. In response hereto, the telephone transceiver 9 of the desktop telephone 3 provides a call announcement signal 41 to the control device 19 bypassing the wireless control network 18. Preferably, the desktop telephone 3 alerts the user about the incoming call by means of visual, acoustic and/or tactile signals. The control device 19 receives the call announcement signal 41 from the telephone transceiver 9 and determines that the call announcement signal 41 was provided by the desktop telephone 3. Similarly to in the first scenario, the determination of the source of the call announcement signal 41 may be based on static information and/or on information comprised by the call announcement signal 41.

Similarly to in the first scenario, the user picks up the wireless headset 4 or the handset 8. The action detector 22, 30 of the picked-up sound interface device 4, 8 detects the user action as an accept action and in response hereto provides a user accept signal 23, 31 to the control device 19 preferably through the wireless control network 18. The control device 19 receives the user accept signal 23, 31 and determines which of the sound interface devices 4, 8 provided the user accept signal 23, 31. Having received the call announcement signal 41 from the telephone transceiver 9 and the user accept signal 23, 31 from the picked-up sound interface device 4, 8, the control device 19 determines whether the received call announcement signal 41 and the received user accept signal 23, 31 are related to one and the same incoming call 40 as described above. In response to having determined that the received call announcement signal 41 and the received user accept signal 23, 31 are related to the same incoming call 40, the control device 19 causes the establishing of an audio connection 17, 44, 48 between the telephone transceiver 9 and the picked-up sound interface device 4, 8.

In the case that the wireless headset 4 was determined to be the source of the user accept signal 23, the control device 19 causes the wireless audio transceiver 13 of the desktop telephone 3 and/or the wireless headset 4 to establish the wireless audio connection 17. The control device 19 may e.g. provide an audio connect signal 42 to the wireless control network 18, and the wireless headset 4 may receive the audio connect signal 42 from the wireless control network 18 and initiate a connection procedure with the desktop telephone 3 to establish the wireless audio connection 17. Alternatively or additionally, the control device 19 may provide an audio connect signal 43 to the wireless audio transceiver 13 of the desktop telephone 3, and the wireless audio transceiver 13 may receive the audio connect signal 43 and initiate a connection procedure with the wireless headset 4 to establish the wireless audio connection 17. The control device 19 may provide the audio connect signal 43 to the wireless audio transceiver 13 bypassing the wireless control network 18, or, alternatively, through the wireless control network 18. Preferably, the control device 19, the wireless audio transceiver 13 or another portion of the desktop telephone 3 causes the desktop telephone 3 to establish an internal audio connection 44 between the handset 8 and the wireless audio transceiver 13, e.g. by providing a switch signal 45, i.e. a system control signal indicating a switch action to be executed, to a connection switch 46 comprised by the desktop telephone 3.

In the case that the handset 8 was determined to be the source of the user accept signal 31, the control device 19 causes the desktop telephone 3 to establish an internal audio connection 44 between the handset 8 and the telephone transceiver 9 of the desktop telephone 3, e.g. by providing a switch signal 45 to a connection switch 46 comprised by the desktop telephone 3.

The desktop telephone 3 preferably accepts the incoming call 40 from the landline telephone network 11 in response to receiving the user accept signal 23, 31 and/or the audio connect signal 43 from the wireless control network 18 and thus establishes a telephone conversation through the landline telephone network 11, the desktop telephone 3 and respectively the wireless headset 4 or the handset 8. Alternatively, the control device 19 may cause the desktop telephone 3 to accept the incoming call 40 by providing a system accept signal to the desktop telephone 3, preferably through the wireless control network 18, in response to having determined that the received call announcement signal 41 and the received user accept signal 23, 31 are related to the same incoming call 40, and the desktop telephone 3 may accept the incoming call 40 in response to receiving the system accept signal.

In any of the two cases, the audio connect signal 42 and/or any of the switch signals 45 may preferably comprise information indicating which devices 3, 4, 8, 9, 13 are to be connected by an audio connection 17, 44, 47, 48.

Figure 5:
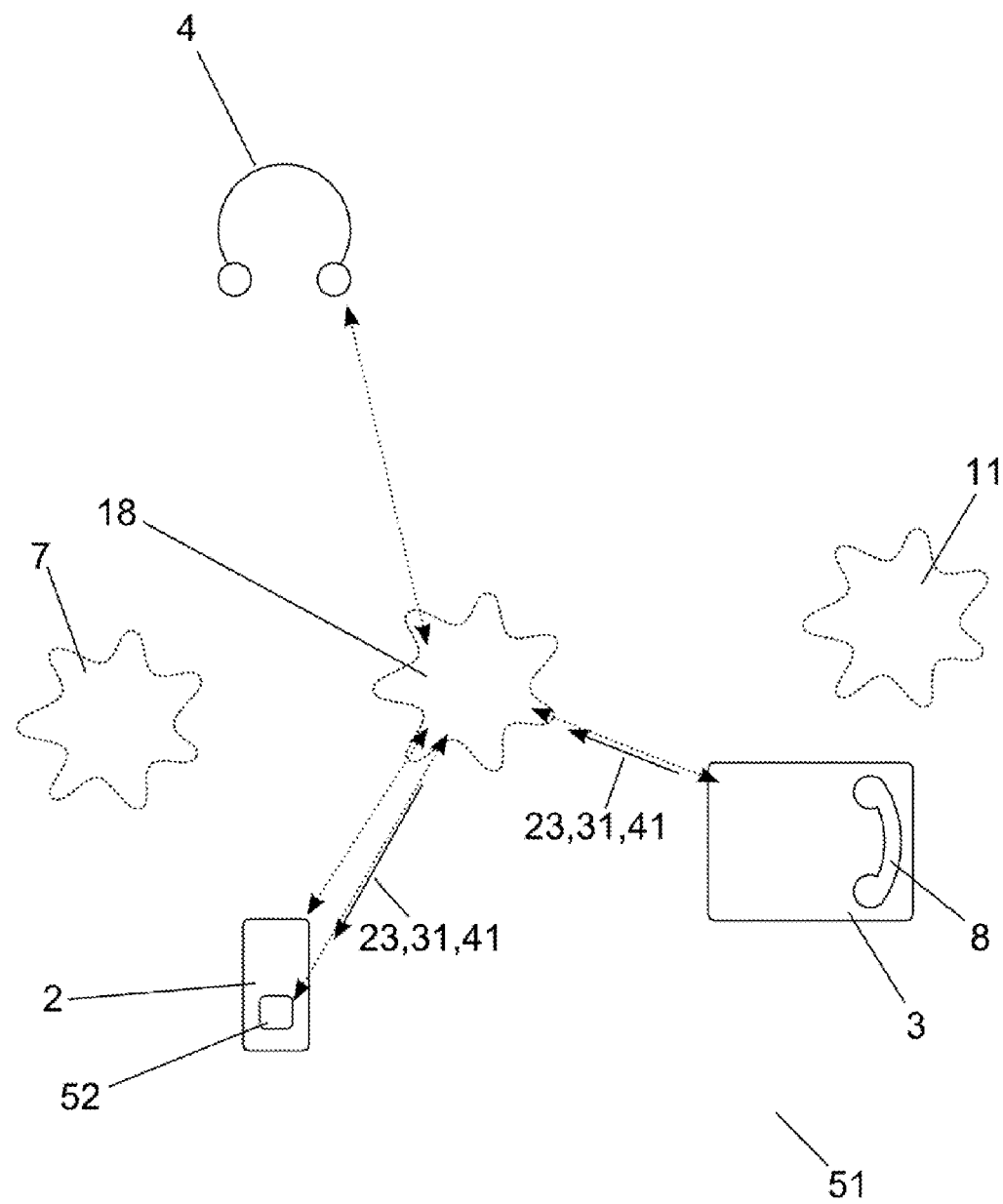
FIG. 5 shows a second embodiment of a desktop telephone system according to the invention.

The desktop telephone system 51 shown in FIG. 5 is similar to the desktop telephone system 1 shown in FIG. 1; however, instead of the control device 19 of the desktop telephone 3, the desktop telephone system 51 comprises a control device 52 comprised by the mobile phone 2. The devices 5, 9, 12, 13, 14, 22, 30 comprised by the desktop telephone system 51 but not shown in FIG. 5 and the devices 2, 3, 4, 8 function in the same way as in the desktop telephone system 1, except for the differences described below. The control device 52 functions substantially in the same way as the control device 19 described above, and thus, from the user's view the desktop telephone system 51 also functions substantially in the same way as the desktop telephone system 1 of FIG. 1.

In order to achieve similar or identical system functionality for the user in the first scenario described above, the desktop telephone 3 of the desktop telephone system 51 is modified to provide the user accept signal 23 to the wireless control network 18, and correspondingly, the control device 52 receives the user accept signal 23 from the wireless control network 18. In the second scenario described further above, the user accept signal 31 and the audio connect signal 32 are already provided to and received from the wireless control network 18, so that the control device 52 can achieve similar or identical system functionality for the user by performing the same operations as the control device 19 and without any further changes.

Correspondingly, in order to achieve similar or identical system functionality for the user in the third scenario described above, the desktop telephone 3 of the desktop telephone system 51 is further modified to provide the call announcement signal 41 to the wireless control network 18, and the control device 52 is further adapted to receive the call announcement signal 41 from the wireless control network 18. Furthermore, in order to properly handle the case wherein the user picks up the handset 8, the desktop telephone 3 is further modified to provide the user accept signal 31 to the wireless control network 18, and the control device 52 is further adapted to receive the user accept signal 31 from the wireless control network 18.

In any scenario, the mobile phone 2 and the control device 52 may communicate with each other through the wireless control network 18 and/or through connections internal to the mobile phone 2 in a way similar to how the desktop telephone 3 of the desktop telephone system 51 and the control device 19 of the desktop telephone system 1 communicate with each other.

In any scenario, the handset 8 may be embodied as a wireless handset, such as e.g. a Bluetooth handset, a DECT handset or a combined Bluetooth and DECT handset. Correspondingly, the handset 8 may e.g. comprise a Bluetooth transceiver and/or a DECT transceiver. The desktop telephone 3 may be embodied as a base station for the handset 8 and thus comprise a Bluetooth transceiver and/or a DECT transceiver, and one or both of the desktop telephone 3 and the handset 8 may be adapted to establish a Bluetooth or a DECT audio connection 44, 47 between each other. The handset 8 is preferably further connectable to the wireless control network 18 as well as through respective audio connections (not shown) to one or more gateway devices 2, 3 in the same way as the wireless headset 4. Thus, the mobile phone 2, the desktop telephone 3 and/or the control device 19, 52 may provide system control signals to the handset 8 and react to system control signals received from the handset 8 in the same way as with system control signals to/from the wireless headset 4. Alternatively, system control signals may be exchanged between the desktop telephone 3 and the handset 8 through the common Bluetooth or DECT connection, and the desktop telephone 3 may thus behave towards other devices 2, 4, 19, 52 of the desktop telephone system 1 substantially as described for the scenarios above.

Figure 6:
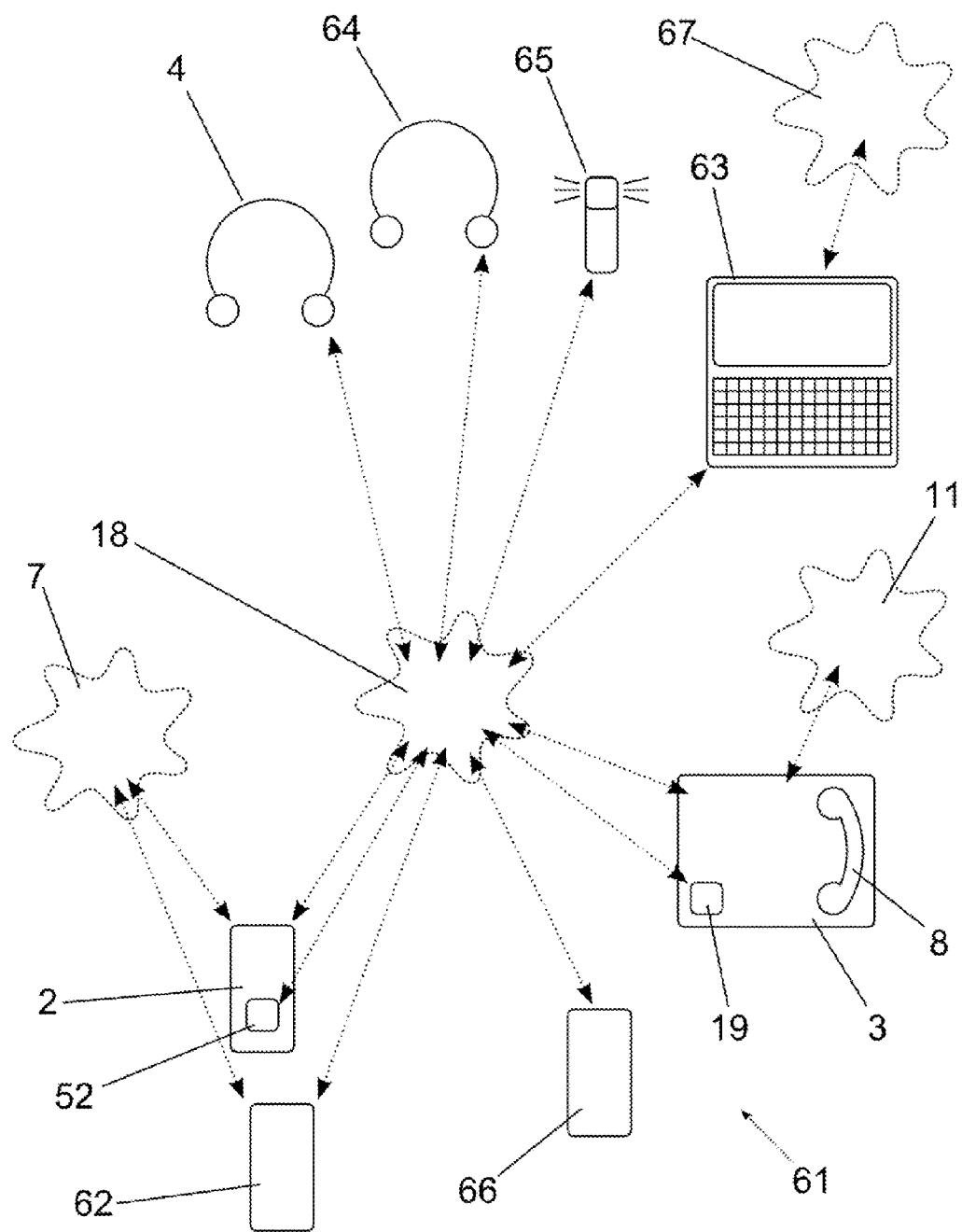
FIG. 6 shows a third embodiment of a desktop telephone system according to the invention.

The desktop telephone system 61 shown in FIG. 6 is similar both to the desktop telephone system 1 shown in FIG. 1 and to the desktop telephone system 51 shown in FIG. 5. The desktop telephone system 61 comprises all of the devices 2, 3, 4, 8 comprised by the above described desktop telephone systems 1, 51 as well as the devices 5, 9, 12, 13, 14, 22, 30 comprised thereby but not shown in FIG. 6, however, the desktop telephone 3 of the desktop telephone system 61 comprises a control device 19 similar to that of the desktop telephone system 1 and the mobile phone 2 of the desktop telephone system 61 comprises a control device 52 similar to that of the desktop telephone system 51. The desktop telephone system 61 may further comprise a second mobile phone 62, a laptop computer 63, a second wireless headset 64, a presence indicator 65 and a user interface device 66, which are preferably all connected to the wireless control network 18.

Each of the second mobile phone 62, the laptop computer 63 and the second wireless headset 64 comprises a speaker driver (not shown) and a microphone (not shown) which enable each of the respective sound interface devices 62, 63, 64 to provide a sound output interface and a sound input interface to a user during telephone conversations. The second mobile phone 62 further comprises a wireless transceiver (not shown) adapted to establish a wireless telephone connection to the mobile phone network 7 and a wireless audio transceiver (not shown) adapted to establish a wireless audio connection (not shown) to at least one of the sound interface devices 2, 3, 4, 8, 63, 64. The second mobile phone 62 is adapted to function as a telephone gateway between the mobile phone network 7 and one or more of the sound interface devices 2, 3, 4, 8, 62, 63, 64. The laptop computer 63 further comprises a wireless transceiver (not shown) adapted to establish a wireless telephone connection to an IP telephone network 67 and a wireless audio transceiver (not shown) adapted to establish a wireless audio connection (not shown) to at least one of the sound interface devices 2, 3, 4, 8, 62, 64. The laptop computer 63 is adapted to function as a telephone gateway between the IP telephone network 67 and one or more of the sound interface devices 2, 3, 4, 8, 62, 63, 64.

Like the mobile phone 2 and the desktop telephone 3, each of the second mobile phone 62 and the laptop computer 63 is adapted to provide a call announcement signal 21, 41 to the wireless control network 18 in response to detecting an incoming telephone call from the respective telephone network 7, 67 and is further adapted to establish an audio connection (not shown) in response to receiving an audio connect signal 25, 26, 32, 42, 43 from the wireless control network 18. Also, like the mobile phone 2, the desktop telephone 3 and the wireless headset 4, each of the second mobile phone 62, the laptop computer 63 and the second wireless headset 64 comprises an action detector (not shown) adapted to provide a user accept signal 23, 31 to the wireless control network 18 in response to detecting an accept action performed by the user and is further adapted to establish an audio connection (not shown) in response to receiving an audio connect signal 25, 26 from the wireless control network 18.

Each of the control device 19 and the control device 52 functions substantially in the same way as the respective control devices 19, 52 of the desktop telephone systems 1, 51 described further above. However, each of the control device 19 and the control device 52 is further adapted to operate in a master mode wherein it provides one or more audio connect signals 25, 26, 32, 42, 43 to the wireless control network 18 as described further above in order to cause the desktop telephone system 61 to establish one or more audio connections 15, 16, 17, 44, 47, 48. At least one of the control device 19 and the control device 52 is further adapted to operate in a slave mode wherein it does not provide the audio connect signals 25, 26, 32, 42, 43, nor any other system control signals, to the wireless control network 18. Preferably, each of the control device 19 and the control device 52 is adapted to temporarily operate in the slave mode. In the following, a control device 19, 52 operating in master mode is referred to as a master control device, and a control device 19, 52 operating in slave mode is referred to as a slave control device.

When both the control device 19 and the control device 52 are connected to the wireless control network 18, preferably only one of the control devices 19, 52 operates in master mode, while the respective other of the control devices 19, 52 operates in slave mode in order to avoid providing conflicting or ambiguous audio connect signals 25, 26, 32, 42, 43 and/or conflicting or ambiguous other system control signals. When only one of the control devices 19, 52 is connected to the wireless control network 18, both may operate in master mode, e.g. to allow the respective other of the control devices 19, 52 to control the establishing of audio connections 15, 16, 17, 44, 47, 48 using a separate wireless control network. In the following, each of such separate wireless control networks 18 is referred to as a subnet even though it functions substantially as the entire wireless control network 18, only with fewer participating devices 2, 3, 4, 8, 19, 52, 62, 63, 64, 65, 66. Thus, depending on the identity of the momentary master control device 19, 52, the desktop telephone system 61 may function substantially as either the desktop telephone system 1 described further above or the desktop telephone system 51 described further above.

The feature that at least one control device 19, 52 is capable of altering operating mode allows the desktop telephone system 61 to easily adapt to changing scenarios when some of the devices of the desktop telephone system 61 are portable and may be used outside the range of the wireless control network 18 as well. For instance, the user may have a wireless speakerphone (not shown) installed in a car and may want to freely choose between using the speakerphone and the wireless headset 4 as sound interface devices for telephone conversations through the mobile phone 2 on the way to the office. In this situation, the mobile phone 2, the wireless headset 4 and the speakerphone may preferably be interconnected through a separate wireless control network 18 or subnet 18 in the car that functions substantially in the same way as the wireless control network 18 in the office, the control device 52 in the mobile phone 2 may preferably operate in master mode to control establishing of audio connections 15 to the wireless headset 4 and/or the speakerphone, and the speakerphone may preferably be adapted to function substantially in the same way as the wireless headset 4. When the user enters the office, the mobile phone 2 may preferably be switched to operating in slave mode and to connect to the wireless control network 18 in the office, such that the desktop telephone system 61 can function substantially as the desktop telephone system 1 described further above. When the mobile phone 2 is out of range of the wireless control network 18 in the office, the control device 52 of the desktop telephone 3 may allow the user—or another person—to use the remaining portion of the desktop telephone system 61 for telephone conversations.

Switching the mobile phone 2 and/or the desktop telephone 3 between operating in master and slave modes may be initiated by the user through a user interface of any device 2, 3, 4, 8, 19, 52, 62, 63, 64, 65, 66. Alternatively, or additionally, the desktop telephone system 61 may comprise a network controller (not shown) that is adapted to cause or allow one of the control devices 19, 52 to operate in master mode and to cause all respective other control devices 19, 52 to operate in slave mode. The network controller may preferably be comprised by one of the control devices 19, 52. Alternatively, or additionally, the control devices 19, 52 may cooperate to perform the functions of the network controller, e.g. by negotiating the master and slave roles among each other by exchanging network control signals with each other when they become aware of each other through the wireless control network 18. The role of network controller may change over time, e.g. when the wireless control network 18 is merged or split, and may further depend on the combination of control devices 19, 52 currently participating on the wireless control network 18. The network controller may set an arbitrary one of the control devices 19, 52 to operate in master mode, or alternatively, select the master role in dependence on predefined criteria, such as e.g. a predetermined priority among the control devices 19, 52, whether a control device 19, 52 is comprised by a gateway device 2, 3, 62, 63 or not, which of several gateway devices 2, 3, 62, 63 comprising one of the control devices 19, 52 was used as the later one during a telephone conversation, and/or on which control device 19, 52 was connected to the larger number of other devices through the wireless control network 18 when the control devices 19, 52 became aware of each other.

The desktop telephone system 61 may comprise one or more further control devices (not shown), e.g. comprised by the second mobile phone 62, the laptop computer 63, the second wireless headset 64 and/or the user interface device 66. Each of these further control devices may be adapted to function substantially as the control device 19 and/or as the control devices 52 and may further be adapted to selectively operate in master or slave mode as described above for the control devices 19, 52. In the case of one or more further control devices being comprised by the desktop telephone system 61, one or both of the control device 19 and the control devices 52 may be omitted. One or more of the further control devices (not shown) may each e.g. be comprised by a token device adapted to be carried by the user, e.g. in a pocket, on a neckband, in a waist belt or the like, such that the token device always follows the user. The control device of the token device may preferably be adapted to always operate in master mode in order to have this control device take priority over other control devices 19, 52. Alternatively, the control device of the token device may be the only control device in the desktop telephone system 61, and the gateway devices 2, 3, 62, 63 and/or the sound interface devices 2, 3, 4, 8, 62, 63, 64 may be adapted to disallow telephone conversations when they are not connected to the control device of the token device. Thus, any devices 2, 3, 4, 8, 62, 63, 64 that are not within a connection range of the control device of the token device and thus of the user, cannot be used for telephone conversations by third persons. Alternatively, the gateway devices 2, 3, 62, 63 and/or the sound interface devices 2, 3, 4, 8, 62, 63, 64 may be adapted to allow only a subset of their capabilities when they are not connected to the control device of the token device. The token device may thus act as a key and/or as a user identification to the desktop telephone system 61. The desktop telephone systems 61 is preferably designed such that the connection range of the control device of the token device is below 100 m, below 20 m, or more preferably, below 5 m. The token device may alternatively be embodied as a software application executing on a mobile computer, such as a mobile phone 2 (a smartphone).

In any of the desktop telephone systems 1, 51, 61 described above, one or more gateway devices 2, 3, 62, 63 and/or one or more sound interface devices 2, 3, 4, 8, 62, 63, 64 may each be adapted to release an audio connection 15, 16, 17, 44, 47, 48 in response to receiving an audio disconnect signal from the wireless control network 18, e.g. to release an audio connection 15, 16, 17, 44, 47, 48 indicated in the audio disconnect signal. Any control device 19, 52 may preferably further be adapted to not provide the audio disconnect signals to the wireless control network 18 when operating in slave mode.

In any of the desktop telephone systems 1, 51, 61 described above, one or more of the control devices 19, 52 may each be adapted to provide an audio disconnect signal to the wireless control network 18 in response to receiving a user accept signal 23, 31 in order to cause a release of any audio connection 15, 16, 17, 44, 47, 48 that is not to be used for a pending telephone call and/or that could interfere with another audio connection 15, 16, 17, 44, 47, 48 that is to be used for the pending telephone call. One or more of the control devices 19, 52 may each be further adapted to provide an audio disconnect signal to the wireless control network 18 in response to receiving one or more other predefined system control signals, such as e.g. a call cancelled signal, a call ended signal, a network lost signal, a user reject signal, a user hang-up signal, a user recall signal, a user call signal, a user redirect signal, a user configuration signal, a system reject signal, a system hang-up signal, a system recall signal, a system call signal and/or a system redirect signal, in particular in dependence on determining that a received system control signal indicates a new use or the disruption of use of an active audio connection 15, 16, 17, 44, 47, 48. Alternatively, or additionally, one or more gateway devices 2, 3, 62, 63 and/or one or more sound interface device 2, 3, 4, 8, 62, 63, 64 may each be adapted to release an audio connection 15, 16, 17, 44, 47, 48 not to be used for a pending telephone call in response to receiving an audio connect signal 25, 26, 32, 42, 43 from the wireless control network 18; the respective device may e.g. release any audio connection 15, 16, 17, 44, 47, 48 that is different from one indicated in the received audio connect signal 25, 26, 32, 42, 43.

The presence indicator 65 comprises a visual indicator, such as e.g. a lamp, an LED or a display screen, adapted to indicate a telephone status to the surroundings of the desktop telephone system 61, e.g. in order to warn the user's colleagues about an ongoing telephone conversation. The presence indicator 65 is adapted to alter a state of the visual indicator, such as e.g. to switch on or off the lamp or the LED or to alter the color or the intensity of emitted or reflected light, or change a picture displayed on a display screen, in response to receiving one or more predefined system control signals, such as e.g. a call alert signal, a pick-up alert signal, a device alert signal, a call announcement signal 21, 41, a call cancelled signal 24, a call established signal, a call ended signal, a network available signal, a network lost signal, a user accept signal 23, 31, a user reject signal, a user hang-up signal, a user recall signal, a user call signal, a user redirect signal, a system accept signal, a system reject signal, a system hang-up signal, a system recall signal, a system call signal, a system redirect signal, an audio connect signal 25, 26, 32, 42, 43 and/or an audio disconnect signal either from the wireless control network 18 or directly from another device 2, 3, 4, 8, 19, 52, 62, 63, 64, 65, 66. The presence indicator 65 may be used in the desktop telephone systems 1, 51 as well. Any of the desktop telephone systems 1, 51, 61 may comprise multiple presence indicators 65, and any presence indicator 65 may be embodied as a separate device or alternatively be comprised by another device, such as e.g. a gateway device 2, 3, 62, 63, a sound interface device 2, 3, 4, 8, 62, 63, 64 or a user interface device 66.

The user interface device 66 comprises a user interface (not shown), which may have an action detector (not shown) that may e.g. be similar to an action detector 22, 30 of the desktop telephone 3 or of the wireless headset 4. The user interface is adapted to provide information to the user and/or to allow the user to interact with the desktop telephone system 61 by performing one or more predefined user actions. The user interface is preferably adapted to provide the information in visual, acoustic and/or tactile form. The user interface is preferably adapted to provide information to the user in response to receiving one or more predefined system control signals, such as e.g. a call alert signal, a pick-up alert signal, a device alert signal, a call announcement signal 21, 41, a call cancelled signal 24, a call established signal, a call ended signal, a network available signal, a network lost signal, a user accept signal 23, 31, a user reject signal, a user hang-up signal, a user recall signal, a user call signal, a user redirect signal, a system accept signal, a system reject signal, a system hang-up signal, a system recall signal, a system call signal, a system redirect signal, an audio connect signal 25, 26, 32, 42, 43 and/or an audio disconnect signal either from the wireless control network 18 or directly from another device 2, 3, 4, 8, 19, 52, 62, 63, 64, 65, 66. The action detector may preferably comprise one or more sensors, such as e.g. an optical sensor, a sound sensor, a touch sensor, a proximity sensor and/or a motion sensor, and is preferable adapted to detect one or more predefined user actions—and preferably further to distinguish between different user actions, in dependence on one or more output signals received from one or more of the sensors. The action detector is preferably adapted to provide one or more system control signals, such as e.g. a user accept signal 23, 31, a user reject signal, a user hang-up signal, a user recall signal, a user call signal, a user redirect signal and/or a user configuration signal, to the wireless control network 18 in response to detecting one or more corresponding different predefined user actions, such as e.g. an accept action, a reject action, a hang-up action, etc. The user interface of the user interface device 66 may comprise any combination of user interface components of any known type, such as e.g. lamps, LEDs, LCD display, software controlled displays, character displays, graphic displays, touch screens, buttons, keys, sliders, touch controls, audio signaling devices, voice signaling devices, voice recognition devices etc.

One or more of the control devices 19, 52 may each be adapted to cause the desktop telephone system 61 to initiate a telephone call in response to receiving a user call signal, to cause the desktop telephone system 61 to reject an incoming telephone call in response to receiving a user reject signal and/or to cause the desktop telephone system 61 to redirect a telephone call in response to receiving a user redirect signal. Redirecting a telephone call may comprise e.g. transferring the telephone call to another telephone network 7, 11, 67 and/or to another gateway device 2, 3, 62, 63 and/or switching to another sound interface device 2, 3, 4, 8, 62, 63, 64 by establishing and/or releasing one or more audio connections 15, 16, 17, 44, 47, 48. The user interface device 66 may thus be used by the user to accept, reject, initiate and transfer telephone calls and/or to select which sound interface device or devices 2, 3, 4, 8, 62, 63, 64 to use in an incoming telephone call or in an ongoing telephone conversation. Similarly, the desktop telephone system 61 may be adapted to allow the user to initiate further actions known from prior art telephone systems, such as e.g. to put a telephone call on hold, to accept and conduct two simultaneous telephone conversations, to allow a supervisor to listen in on a telephone conversation and/or to merge two or more telephone conversations into a telephone conference. In order to achieve this, the desktop telephone system 61 may be adapted to provide and decode further system control signals and/or to transmit sound signals through two or more of the audio connections 15, 16, 17, 44, 47, 48 at the same time.

The user interface device 66 may further be adapted to allow the user to configure the desktop telephone system 61 by interacting with the user interface. The user interface device 66 is preferably adapted to detect one or more predefined configuration actions performed by the user and to provide one or more corresponding user configuration signals in response hereto. The user interface device 66 is preferably adapted to provide one or more user configuration signals comprising configuration information to a control device 19, 52 and/or to the network controller 19, 52, preferably through the wireless control network 18. One or more of the control devices 19, 52 and/or the network controller is preferably adapted to receive the system control signals and to store received configuration information. One or more of the control devices 19, 52 and/or the network controller is preferably adapted to retrieve the stored configuration information and to control the desktop telephone system 61 in dependence hereon. The configuration information may e.g. prescribe which of the control devices 19, 52 shall or may act as network controller, which of the control devices 19, 52 shall or may operate in master mode, whether the master role may be selected dynamically, conditions for master mode selection and priorities among the control devices 19, 52, which devices 2, 3, 4, 8, 19, 52, 62, 63, 64, 65, 66 may participate on the wireless control network 18, which devices and/or pairs of devices may establish audio connections 15, 16, 17, 44, 47, 48, which audio connections 15, 16, 17, 44, 47, 48 are to be established and/or released when receiving call announcement signals 21, 41 and user accept signals 23, 31 from different combinations of devices 2, 3, 4, 8, 62, 63, 64, 65, whether, which and/or on which conditions sound interface devices 2, 3, 4, 8, 62, 63, 63 may be used to take over an ongoing telephone conversation and/or may be used simultaneously in one and the same telephone conversation, which user actions map to which user commands, etc. One or more of the control devices 19, 52 and/or the network controller is preferably adapted to control the desktop telephone system 61 in dependence on such prescriptions. The configuration information may comprise prescriptions for multiple users, and one or more of the control devices 19, 52 and/or the network controller is preferably adapted to control the desktop telephone system 61 in dependence on such user-dependent prescriptions and/or on an identification of the current user, e.g. provided by a token device.

The user interface device 66 may be used in the desktop telephone systems 1, 51 as well. Any desktop telephone system 1, 51, 61 may comprise multiple user interface devices 66, and any user interface device 66 may be embodied as a separate device or alternatively be comprised by another device, such as e.g. a gateway device 2, 3, 62, 63 or a sound interface device 2, 3, 4, 8, 62, 63, 64. In the latter case, the user interface of the user interface device 66 may be further adapted to allow the user further interaction with the respective device 2, 3, 4, 8, 19, 52, 62, 63, 64, 65, 66, preferably, but not necessarily, bypassing the wireless control network 18. Any user interface device 66 may preferably be embodied as a tablet computer or a smartphone equipped with a corresponding software application adapted to allow the user to control the desktop telephone system 1, 51, 61 by interacting with the user interface of the tablet computer or smartphone. Correspondingly, the desktop telephone system 61 may further be adapted to allow the user to control other devices 2, 3, 4, 8, 62, 63, 64, 65 through the wireless control network 18 by interacting with the user interface of the user interface device 66.

Instead of, or in addition to, any or both of the control devices 19, 52 comprised by the mobile phone 2 and the desktop telephone 3, the desktop telephone system 61 may comprise one or more further control devices (not shown), each of which may be embodied as a separate device or alternatively be comprised by another device, such as e.g. a gateway device 62, 63, a sound interface device 4, 8, 62, 63, 64 or a user interface device 66. The further control device or devices may preferably be adapted to operate as master control device and/or as slave control device substantially in the same way as described above for the control devices 19, 52. Any control device 19, 52 may preferably be embodied as a tablet computer or a smartphone equipped with a corresponding software application adapted to allow the tablet computer or smartphone to operate as a control device 19, 52 as described above.

Any desktop telephone system 1, 51, 61 may comprise further devices and device types, including devices and device types not described in the present application. Such further devices may be adapted to connect to the wireless control network 18. Likewise, any desktop telephone system 1, 51, 61 may comprise one or more further sound interface devices (not shown) and/or gateway devices (not shown) adapted to operate respectively substantially as the sound interface devices 2, 3, 4, 8, 62, 63, 64 described further above and/or substantially as the gateway devices 2, 3, 62, 63 described further above. Such further sound interface devices may e.g. comprise portable wireless microphones, wireless hearing aids and wired or wireless speakerphones. In any subset of sound interface devices 2, 3, 4, 8, 62, 63, 64 the microphone may be omitted in which case the respective device may be used for sound output only. In any subset of sound interface devices 2, 3, 4, 8, 62, 63, 64 the speaker driver may be omitted in which case the respective device may be used for sound input only.

In any desktop telephone system 1, 51, 61, one or more gateway devices 2, 3, 62, 63 may each be further adapted to provide a call alert signal to the wireless control network 18 in response to detecting an incoming telephone call 20, 40 from a telephone network 7, 11, 67, and one or more devices among the gateway devices 2, 3, 62, 63, the sound interface devices 2, 3, 4, 8. 62, 63, 64, the presence indicator 65 and the user interface device 66 may be adapted to alert the user about the incoming call by means of visual, acoustic and/or tactile signals in response to receiving a call alert signal from the wireless control network 18. One or more of the call alert signals may be embodied as a call announcement signal 21, 41. Similarly, one or more devices among the gateway devices 2, 3, 62, 63, the sound interface devices 2, 3, 4, 8. 62, 63, 64, the presence indicator 65 and the user interface device 66 may be adapted to alert the user about the possibility to use a specified sound interface device 2, 3, 4, 8. 62, 63, 64 in an ongoing telephone conversation and/or about a new device by means of visual, acoustic and/or tactile signals in response to receiving respectively a pick-up alert signal or a device alert signal from the wireless control network 18.

In any desktop telephone system 1, 51, 61, each of the audio connections 15, 16, 17, 44, 47, 48 may be implemented as a wired or as a wireless connection using one or more transmission channels. Any audio connection 15, 16,

17, 44, 47, 48 that is implemented as a wireless connection is preferably implemented according to a wireless communication standard. In the present context, the term "communication standard" refers to an internationally recognized interface specification of one or more communication protocols allowing products from multiple manufacturers to communicate with each other. Examples of suitable wireless communication standards that enable transmission of sound signals include Bluetooth, DECT and Wi-Fi (IEEE Standard 802.11). For instance, the DECT standard defines a Generic Access Profile (GAP) which is a communication protocol that allows any devices conforming thereto to communicate audio and control signals to each other. DECT requires two devices to be paired—thereby establishing a bond between the devices—prior to establishing a connection between them.

At the time of writing the present application, the Bluetooth Core Specification has reached version 4.1. This version includes Classic Bluetooth, Bluetooth High Speed (HS) and Bluetooth Low Energy (LE) communication protocols. Bluetooth HS is based on Wi-Fi, and Classic Bluetooth consists of legacy Bluetooth communication protocols. In Classic Bluetooth, point-to-point audio connections may be implemented using e.g. the Headset Profile (HSP), the Hands-Free Profile (HFP), the Intercom Profile (ICP) or the Advanced Audio Distribution Profile (A2DP). All of these profiles use a Synchronous Connection Oriented (SCO) link or an Extended SCO (eSCO) link to carry the audio signals between two devices. Classic Bluetooth requires the two devices to be paired—thereby establishing a bond between the devices—prior to establishing a connection between them. Classic Bluetooth and Bluetooth HS may be used to implement high-quality audio connections, but at the same time the technology is rather power consuming. Also, the time required to establish connections between devices, even when they are already paired, may be rather long. Conversely, Bluetooth LE is designed to allow point-to-multipoint communication between a channel master device and up to seven slave devices with very low power consumption and low connection overhead, but is not well-suited for high-quality audio communication.

In the case that multiple of the audio connections 15, 16, 17, 44, 47, 48 are implemented as wireless connections, they may all be implemented according to one and the same wireless communication standard and/or communication protocol. Alternatively, one or more of the audio connections 15, 16, 17, 44, 47, 48 may be implemented according to a different wireless communication standard and/or a different communication protocol. For instance, the audio connections 15, 16 between the mobile phone 2 and respectively the wireless headset 4 and the desktop telephone 3 may be implemented according to one of the Bluetooth Classic protocols, while the audio connection 17 between the desktop telephone 3 and the wireless headset 4 may be implemented according to the DECT GAP protocol.

In any desktop telephone system 1, 51, 61, the wireless control network 18 preferably comprises one or more wireless connections sharing a common transmission channel, such that all devices 2, 3, 4, 8, 19, 52, 62, 63, 64, 65, 66 connected to the wireless control network 18 may receive system control signals from all other connected devices 2, 3, 4, 8, 19, 52, 62, 63, 64, 65, 66. Alternatively, or additionally, one or more devices 2, 3, 4, 8, 19, 52, 62, 63, 64, 65, 66 may be adapted to relay system control signals to one or more other devices 2, 3, 4, 8, 19, 52, 62, 63, 64, 65, 66 through one or more other transmission channels. One or more of the devices 2, 3, 4, 8, 19, 52, 62, 63, 64, 65, 66, preferably a control device 19, 52—and preferably the current master control device 19, 52, may be adapted to act as channel master. The wireless control network 18 may have any known network topology, such as e.g. star (point-to-multipoint), tree, ring or mesh, and the topology may change over time.

In any desktop telephone system 1, 51, 61, the wireless control network 18 may preferably be implemented according to a wireless communication standard. Examples of suitable wireless communication standards and/or communication protocols that allow transmission of system control signals include Bluetooth Classic, Bluetooth HS, DECT, Wi-Fi, Bluetooth LE and ZigBee. The wireless control network 18 may preferably be implemented according to a wireless communication standard and/or communication protocol, such as e.g. Bluetooth LE or ZigBee, that allows the desktop telephone system 1, 51, 61 to consume substantially less electric power than would be required if the system control signals 21, 23, 24, 25, 26, 31, 32, 42, 43, 45 were transmitted through one or more of the audio connections 15, 16, 17, 44, 47, 48. This may allow battery-powered devices, such as e.g. the mobile phones 2, 62, the wireless headsets 4, 64, the presence indicator 65 and the user interface device 66, to be connected to the wireless control network 18 for several hours, days or weeks without draining their batteries. At the same time, high quality wireless audio connections 15, 16, 17, 44, 47, 48 can be established when needed.

In the case that the wireless control network 18 is implemented according to the Bluetooth LE protocol, a master control device 19, 52 preferably acts as Bluetooth LE channel master, while all other devices 2, 3, 4, 8, 19, 52, 62, 63, 64, 65, 66 of the desktop telephone system 61 act as Bluetooth LE slave devices. Furthermore, the role as Bluetooth LE channel master preferably follows the identity of the master control device 19, 52 when it changes within the wireless control network 18.

In the case that the wireless control network 18 is implemented according to the Bluetooth LE protocol, any gateway device 2, 3, 62, 63 or sound interface device 2, 3, 4, 8, 62, 63, 64 that comprises a wireless audio transceiver 12, 13, 14 for establishing a Bluetooth Classic audio connection 15, 16, 17, 44, 47, 48 may preferably use the same wireless audio transceiver 12, 13, 14 for Bluetooth LE communication through the wireless control network 18.

Preferably, one or more control devices 19, 52 are each further adapted to maintain a device register comprising information about devices 2, 3, 4, 8, 19, 52, 62, 63, 64, 65, 66 of the desktop telephone system 61 that are allowed to participate on the wireless control network 18 and an audio connection register comprising information about audio connections 15, 16, 17, 44, 47, 48 that may be established between registered devices 2, 3, 4, 8, 62, 63, 64, 65, 66. For each registered device 2, 3, 4, 8, 19, 52, 62, 63, 64, 65, 66, the registered device information may preferably comprise a unique device identifier and/or a device connection status indicating whether the device 2, 3, 4, 8, 19, 52, 62, 63, 64, 65, 66 is connected through the wireless control network 18 to the respective control device 19, 52 or is disconnected. For each registered audio connection 15, 16, 17, 44, 47, 48, the registered audio connection information may preferably comprise a unique audio connection identifier, identifiers for the devices 2, 3, 4, 8, 19, 52, 62, 63, 64, 65, 66 between which the audio connection 15, 16, 17, 44, 47, 48 may be established and/or an audio connection status indicating whether the audio connection 15, 16, 17, 44, 47, 48 is active (i.e. established) or passive (i.e. released) and/or whether the audio connection 15, 16, 17, 44, 47, 48 is currently in use for a telephone conversation. In the case that more than one telephone conversation is ongoing, the audio connection status preferably further indicates which of the telephone conversations that goes through the respective audio connection 15, 16, 17, 44, 47, 48.

One or more control devices 19, 52 are preferably each further adapted to update the registers in dependence on network control signals received from one or more other devices 2, 3, 4, 8, 19, 52, 62, 63, 64, 65, 66 of the desktop telephone system 61 and to provide the system control signals 21, 23, 24, 25, 26, 31, 32, 42, 43, 45 to the wireless control network 18 in dependence on device and audio connection information in the registers. Preferably, one or more control devices 19, 52 are each further adapted to repeatedly determine whether each of the registered devices 2, 3, 4, 8, 19, 52, 62, 63, 64, 65, 66 is connected to the respective control device 19, 52 or not, at least when operating in master mode, and to record the current device connection status in the device register. Similarly, one or more control devices 19, 52 are preferably each further adapted to repeatedly determine whether each of the registered audio connections 15, 16, 17, 44, 47, 48 is active or passive and to record the current audio connection status in the audio connection register. One or more control devices 19, 52 may preferably each be further adapted to repeatedly provide a network status request to one or more devices 2, 3, 4, 8, 19, 52, 62, 63, 64, 65, 66, e.g. in a predefined time schedule and/or when being reconnected to a device 2, 3, 4, 8, 19, 52, 62, 63, 64, 65, 66. A network status request is a network control signal indicating a request to provide one or more network control signals comprising device and/or audio connection information.

Correspondingly, one or more devices 2, 3, 4, 8, 19, 52, 62, 63, 64, 65, 66 of the desktop telephone system 61 are preferably each adapted to provide network control signals, e.g. comprising device and/or audio connection information, to a control device 19, 52 in response to a predefined event. Examples of predefined events that may trigger a device 2, 3, 4, 8, 19, 52, 62, 63, 64, 65, 66 to provide a network control signal include detecting a predefined user action, receiving a network status request, completing a pairing procedure with another device 2, 3, 4, 8, 62, 63, 64, 65, 66, removing a bond to another device 2, 3, 4, 8, 62, 63, 64, 65, 66, becoming aware of a new device 2, 3, 4, 8, 62, 63, 64, 65, 66 and/or reaching a predefined point in a predefined time schedule. In the case that a pairing or a bond removal takes place at a time when none or only one of the two involved devices 2, 3, 4, 8, 62, 63, 64, 65, 66 is connected to a control device 19, 52, one or both of the two involved devices 2, 3, 4, 8, 62, 63, 64, 65, 66 may provide the respective audio connection information in a network control signal in response to being reconnected to a control device 19, 52.

The desktop telephone system 61 is preferably adapted to allow the user to introduce a new device 2, 3, 4, 8, 19, 52, 62, 63, 64, 65, 66 into the system 61 by one or more methods, which may e.g. include interacting with a user interface of a device 2, 3, 4, 8, 19, 52, 62, 63, 64, 65, 66 registered in one or more of the control devices 19, 52, interacting with a user interface of the new device 2, 3, 4, 8, 19, 52, 62, 63, 64, 65, 66 and/or pairing the new device 2, 3, 4, 8, 19, 52, 62, 63, 64, 65, 66 with a device 2, 3, 4, 8, 19, 52, 62, 63, 64, 65, 66 registered in one or more of the control devices 19, 52. The user interaction may e.g. comprise commanding one or more devices 2, 3, 4, 8, 19, 52, 62, 63, 64, 65, 66 on the wireless control network 18 into a discovery mode that requests or allows the new device 2, 3, 4, 8, 19, 52, 62, 63, 64, 65, 66 to provide device and/or audio connection information related to itself to one or more of the control devices 19, 52 and/or to one or more of the registered devices 2, 3, 4, 8, 19, 52, 62, 63, 64, 65, 66, commanding the new device 2, 3, 4, 8, 19, 52, 62, 63, 64, 65, 66 into a connect mode that causes the new device 2, 3, 4, 8, 19, 52, 62, 63, 64, 65, 66 to provide device and/or audio connection information related to itself to one or more of the control devices 19, 52 and/or manually entering device and/or audio connection information related to the new device 2, 3, 4, 8, 19, 52, 62, 63, 64, 65, 66 through the user interface of the registered device 2, 3, 4, 8, 19, 52, 62, 63, 64, 65, 66.

Correspondingly, one or more devices 2, 3, 4, 8, 19, 52, 62, 63, 64, 65, 66 are preferably each adapted to provide a network control signal comprising device and/or audio connection information related to a new device 2, 3, 4, 8, 19, 52, 62, 63, 64, 65, 66 in response to detecting a predefined user action, in response to receiving device and/or audio connection information from the new device 2, 3, 4, 8, 19, 52, 62, 63, 64, 65, 66 and/or in response to completing a pairing procedure with the new device 2, 3, 4, 8, 19, 52, 62, 63, 64, 65, 66. Preferably, one or more of the control devices 19, 52 are each further adapted to record the indicated device and/or audio connection information related to already registered and/or new devices 2, 3, 4, 8, 62, 63, 64, 65, 66 to its device and/or audio connection register in response to receiving one or more predefined network control signals. Preferably, one or more of the control devices 19, 52 are each further adapted to record for each device 2, 3, 4, 8, 62, 63, 64, 65, 66 an individual device connection status for each control device 19, 52. A control device 19, 52 may thus e.g. record a local device connection status indicating that a device 2, 3, 4, 8, 62, 63, 64, 65, 66 is connected to the control device 19, 52 itself, while simultaneously recording a remote device connection status indicating that the device 2, 3, 4, 8, 62, 63, 64, 65, 66 is disconnected from the respective other control device 19, 52, e.g. in response to receiving a network control signal from a control device 19, 52 or from another device 2, 3, 4, 8, 62, 63, 64, 65, 66.

Preferably, one or more of the control devices 19, 52 are each further adapted to provide a network control signal comprising registered device and/or audio connection information to another control device 19, 52 in response to a predefined event. Examples of predefined events that may trigger a control device 19, 52 to request and/or provide a network control signal include detecting a predefined user action, receiving a network status request from another control device 19, 52, receiving one or more predefined network control signals from another device 2, 3, 4, 8, 19, 52, 62, 63, 64, 65, 66, detecting reconnection of another control device 19, 52, receiving information related to a new device 2, 3, 4, 8, 19, 52, 62, 63, 64, 65, 66 and/or reaching a predefined point in a predefined time schedule. Thus, the control devices 19, 52 may repeatedly exchange registered information in order to allow each of the control devices 19, 52 to maintain complete device and audio connection registers, for instance during and/or after splitting and/or merging of the wireless control network 18.

In a fourth scenario, a user may e.g. have a mobile phone 2 and a wireless headset 4 at home, while the remaining devices 3, 19, 62, 63, 64, 65, 66 of the desktop telephone system 61 are in the office. In this situation, each of the control devices 19, 52 may control its own subnet 18.

When the user enters the office, the control devices 19, 52 may become aware of each other, preferably by receiving one or more signals from each other through the wireless control network 18, and one or both of the control devices 19, 52 may engage in a merging procedure to merge the subnets 18 into a single wireless control network 18. During the merging procedure, one or both of the control devices 19, 52 may act as network controller which causes e.g. the control device 52 of the mobile phone 2 to operate in slave mode and further causes the control device 52 of the mobile phone 2 to provide one or more network control signals to the control device 19 of the desktop telephone 3 comprising information about any devices connected to the mobile phone 2, such as the wireless headset 4, and about the audio connection 15 between them. Continuing to operate in master mode, the control device 19 of the desktop telephone 3 records the device and audio connection information received from the other control device 52 in respectively its own device register and its own audio connection register. Subsequently, the control device 19 treats the wireless headset 4 as connected on the wireless control network 18 and thus provides the system control signals 21, 23, 24, 25, 26, 31, 32, 42, 43, 45 to the wireless headset 4. Furthermore, now being informed about the audio connection 15, the control device 19 may provide to the wireless headset 4 and/or to the mobile phone 2 audio connect signals 25, 26, 32, 42, 43 indicating the audio connection 15 in response to receiving one or more system control signals that indicate that these two devices 2, 4 are to be used in a telephone conversation. The desktop telephone system 61 is preferably further adapted to allow the user to enable and disable this automatic merging of the wireless control network 18, preferably as part of the configuration.

In a fifth scenario, a user at home may pair a new wireless Bluetooth headset 64 with a mobile phone 2 and subsequently use the paired devices 2, 64 for mobile telephone conversations in already known way. In response to completing the pairing procedure, the mobile phone 2 provides information about the new wireless Bluetooth headset 64 to its control device 52, which registers the new wireless Bluetooth headset 64 in the device register and the new audio connection (not shown) in the audio connection register. When the user enters the office, the control device 19 in the desktop telephone 3 and the control device 52 in the mobile phone 2 become aware of each other and merge the subnets 18. During the merging procedure, the control device 52 of the mobile phone 2 provides information about the new wireless Bluetooth headset 64 and the new audio connection to the control device 19, which records the received information. Subsequently, the control device 19 allows the new wireless Bluetooth headset 64 to participate on the merged wireless control network 18 and thus provides the system control signals 21, 23, 24, 25, 26, 31, 32, 42, 43, 45 to the new wireless Bluetooth headset 64 as well. Furthermore, now being informed about the new possible audio connection, the control device 19 may provide to the new wireless Bluetooth headset 64 and/or to the mobile phone 2 audio connect signals 25, 26, 32, 42, 43 indicating the new audio connection in response to receiving one or more system control signals that indicate that these two devices are to be used in a telephone conversation.

The desktop telephone system 61 may thus allow the user to add new devices 2, 3, 4, 8, 62, 63, 64, 65, 66 to the desktop telephone system 61 with very little manual interaction and preferably requiring manual interaction with only one of the devices 2, 3, 4, 8, 62, 63, 64, 65, 66 already registered in the network 18. The desktop telephone system 61 is preferably further adapted to allow the user to enable and disable this semiautomatic registering of new devices 2, 3, 4, 8, 62, 63, 64, 65, 66, preferably as part of the configuration, and/or to have the control devices 19, 52 unregister a registered device 2, 3, 4, 8, 62, 63, 64, 65, 66.

When informing about a new device 2, 3, 4, 8, 62, 63, 64, 65, 66, one or more of the devices 2, 3, 4, 8, 62, 63, 64, 65, 66 of the desktop telephone system 61 may each be further adapted to include pairing information allowing a recipient device 2, 3, 4, 8, 62, 63, 64, 65, 66 to create a bond with the new device 2, 3, 4, 8, 62, 63, 64, 65, 66 without requiring manual interaction. This allows the desktop telephone system 61 to subsequently establish an audio connection 15, 16, 17, 44, 47, 48 between a recipient device 2, 3, 4, 8, 62, 63, 64, 65, 66 and the new device 2, 3, 4, 8, 62, 63, 64, 65, 66 without further user action than one indicating an accept of an incoming telephone call. Correspondingly, one or more of the control devices 19, 52 may each be further adapted to receive and register the pairing information and to cause a third device 2, 3, 4, 8, 62, 63, 64, 65, 66 to create a bond with the new device 2, 3, 4, 8, 62, 63, 64, 65, 66 without requiring manual interaction. In the fifth scenario described above, the user may thus use the new wireless headset 64 for a telephone conversation through e.g. the desktop telephone 3 without ever needing to manually perform a pairing of the two devices 3, 64 with each other. The desktop telephone system 61 may thus allow the user to add new gateway and/or sound interface devices 2, 3, 4, 8, 62, 63, 64, 65, 66 to the desktop telephone system 61 and use them without having to pair the new devices 2, 3, 4, 8, 62, 63, 64, 65, 66 with more than one of the devices 2, 3, 4, 8, 62, 63, 64, 65, 66 already registered in the network 18. The desktop telephone system 61 is preferably further adapted to allow the user to enable and disable this semiautomatic pairing, preferably as part of the configuration.

Semiautomatic pairing will, however, only work for audio connections 15, 16, 17, 44, 47, 48 for which manual device pairing is not a mandatory security feature. Thus, the desktop telephone system 61 may alternatively, or additionally, be further adapted to alert the user about a new device 2, 3, 4, 8, 62, 63, 64, 65, 66. Preferably, one or more of the control devices 19, 52 may each be further adapted to provide a device alert signal in response to receiving information related to a new device 2, 3, 4, 8, 62, 63, 64, 65, 66, and one or more of the devices 2, 3, 4, 8, 62, 63, 64, 65, 66 may each be adapted to alert the user through its user interface in response to receiving a device alert signal. Alerting the user preferably comprises prompting the user to perform a pairing of the new device 2, 3, 4, 8, 62, 63, 64, 65, 66 with one or more other devices 2, 3, 4, 8, 62, 63, 64, 65, 66 of the desktop telephone system 61.

In any desktop telephone system 61 comprising two or more control devices 19, 52, one or more of the control devices 19, 52 are preferably each further adapted to repeatedly determine the device connection status of one or more other devices 2, 3, 4, 8, 19, 52, 62, 63, 64, 65, 66 and to initiate a network splitting procedure in response to one or more first split events, such as e.g. detecting a disconnection of one or more devices 2, 3, 4, 8, 19, 52, 62, 63, 64, 65, 66, receiving audio connection information indicating that an audio connection 15, 16, 17, 44, 47, 48 was lost or released and/or receiving one or more predefined system control signals provided by another device 2, 3, 4, 8, 62, 63, 64, 66 in response to detecting one or more predefined user actions. Initiation of the network splitting procedure may further be dependent on the number, type, identity and/or remote device connection status of disconnected devices 2, 3, 4, 8, 19, 52, 62, 63, 64, 65, 66 and/or on whether a telephone conversation is currently ongoing or not. Preferably, one or more of the control devices 19, 52 are further adapted to execute the splitting procedure, alone or in cooperation with one or more other control devices 19, 52, in order to separate the wireless control network 18 into two or more subnets 18. The splitting procedure may comprise causing one or more slave control devices 19, 52 to switch to master mode in order to have each of the two or more subnets 18 controlled by an individual master control device 19, 52. The splitting procedure may further comprise individually assigning each of one or more devices 2, 3, 4, 8, 19, 52, 62, 63, 64, 65, 66 to one of the subnets 18 and/or to release one or more active audio connections 15, 16, 17, 44, 47, 48 that connect devices 2, 3, 4, 8, 19, 52, 62, 63, 64, 65, 66 across subnet boundaries.

The assigning of devices 2, 3, 4, 8, 19, 52, 62, 63, 64, 65, 66 to subnets 18 may preferably be dependent on the number, type, identity and/or remote device connection status of disconnected devices 2, 3, 4, 8, 19, 52, 62, 63, 64, 65, 66, on the type of user action indicated in a received system control signal and/or on whether one or more telephone conversations are ongoing or not. In the case that a telephone conversation is ongoing, the desktop telephone system 61 preferably attempts to assign all devices 2, 3, 4, 8, 19, 52, 62, 63, 64, 65, 66 that are involved in the telephone conversation to one and the same subnet 18. The assigning to subnets 18 of devices 2, 3, 4, 8, 19, 52, 62, 63, 64, 65, 66 not being involved in a telephone conversation may preferably be dependent on one or more criteria, such as e.g. a determined status, quality and/or signal strength of a connection to one or more of the control devices 19, 52, stored configuration information, with which control device 19, 52 a device 2, 3, 4, 8, 19, 52, 62, 63, 64, 65, 66 has previously or typically shared a subnet 18, and/or with which gateway devices 2, 3, 62, 63 and/or sound interface devices 2, 3, 4, 8, 62, 63, 64 a device 2, 3, 4, 8, 19, 52, 62, 63, 64, 65, 66 has previously or typically been connected to through an audio connection 15, 16, 17, 44, 47, 48. The signal strength, which is e.g. available as RSSI (Receive Signal Strength Indication) in the Bluetooth LE protocol, may provide an estimation of the distance between devices and may thus be used to estimate or determine the physical distances between two or more of the devices 2, 3, 4, 8, 19, 52, 62, 63, 64, 65, 66.

Generally, the network controller 19, 52 and/or any of the control devices 19, 52 preferably attempts to assign all devices 2, 3, 4, 8, 19, 52, 62, 63, 64, 65, 66 that are typically used together in telephone conversations to one and the same subnet 18, unless there are good reasons to assign them otherwise. Such good reasons may e.g. include detecting that the user has commanded a different assigning of one and more devices 2, 3, 4, 8, 19, 52, 62, 63, 64, 65, 66, detecting that one or more devices 2, 3, 4, 8, 19, 52, 62, 63, 64, 65, 66 are currently involved in a telephone conversation through a typically less used audio connection 15, 16, 17, 44, 47, 48, and/or detecting that a device 2, 3, 4, 8, 19, 52, 62, 63, 64, 65, 66 for a longer time period has not been connected to—or has had a relatively large physical distance to—a control device 19, 52 with which it should otherwise share a subnet 18 after the splitting. The network controller 19, 52 may preferably provide a network control signal to one or more of the control devices 19, 52 comprising an indication of the assignment of one or more devices 2, 3, 4, 8, 19, 52, 62, 63, 64, 65, 66. In some embodiments, the network controller 19, 52 and/or any of the control devices 19, 52 may assign devices 2, 3, 4, 8, 19, 52, 62, 63, 64, 65, 66 not currently being involved in a telephone conversation in dependence on respective determined signal strengths.

The network controller 19, 52 may preferably execute the actual splitting of the wireless control network 18, i.e. the transition from a situation with only one master control device 19, 52 to a situation with two or more master control devices 19, 52 each controlling an individual subnet 18, in response to a second split event, such as e.g. one or more control devices 19, 52 detecting disconnection of one or more other control devices 19, 52 and/or one or more control devices 19, 52 detecting that all devices 2, 3, 4, 8, 19, 52, 62, 63, 64, 65, 66 connected to the respective control device 19, 52 are disconnected from all other control devices 19, 52. In order to facilitate detection of the latter event, one or more devices 2, 3, 4, 8, 19, 52, 62, 63, 64, 65, 66 may each be adapted to repeatedly provide a network control signal to the wireless control network 18 indicating which control devices 19, 52 the respective device 2, 3, 4, 8, 19, 52, 62, 63, 64, 65, 66 is currently connected to. This may prevent that multiple control devices 19, 52 provide colliding system control signals on the wireless control network 18 and/or attempt to control one and the same device 2, 3, 4, 8, 19, 52, 62, 63, 64, 65, 66, e.g. if two or more devices 2, 3, 4, 8, 19, 52, 62, 63, 64, 65, 66 are slowly moved apart. It may further cause the control devices 19, 52 to become aware of each earlier when two subnets 18 are brought closer to each other. One or more of the control devices 19, 52 may thus each be adapted to engage in a merging procedure in response to receiving a network control signal from a device 2, 3, 4, 8, 62, 63, 64, 65, 66 indicating that the providing device 2, 3, 4, 8, 62, 63, 64, 65, 66 is currently connected to a respective other control device 19, 52.

The network controller 19, 52 may preferably execute the actual splitting of the wireless control network 18 with a predefined time delay after detection of a second split event. Within the delay period, the network controller 19, 52 may further cancel a pending splitting in response to detecting an event that indicates reconnection of one or more of the connections causing the second split event. This may allow the desktop telephone system 61 to continue meaningful operation during short disconnections. Furthermore, the network controller 19, 52 may apply appropriate filtering to first and/or second split events and/or their causing events in order to avoid too fast and/or repeated switching back and forth between split and merged states of the wireless control network 18.

The network controller 19, 52 may preferably be adapted to cause multiple master control devices 19, 52 to use different transmission channels for communicating through their respective subnets 18 after the actual splitting of the wireless control network 18. This may aid further in preventing that multiple control devices 19, 52 provide colliding system control signals on the wireless control network 18 and/or attempt to control one and the same device 2, 3, 4, 8, 19, 52, 62, 63, 64, 65, 66. Alternatively, in the case that individual time slots are assigned statically or semi-statically, e.g. by the network controller 19, 52, to each device 2, 3, 4, 8, 19, 52, 62, 63, 64, 65, 66 participating on the wireless control network 18, each participating device 2, 3, 4, 8, 19, 52, 62, 63, 64, 65, 66 may be adapted to continue transmitting to the wireless control network 18 only in its assigned time slot after splitting of the wireless control network 18. Preferably, one or more of these control devices 19, 52 are further adapted to intermittently transmit a network control signal and/or listen for network control signals using one or more transmission channels used by one or more other subnets 18 and/or using a transmission channel specifically dedicated to detecting devices 2, 3, 4, 8, 19, 52, 62, 63, 64, 65, 66 that are not currently connected to a respective subnet 18 and/or to the wireless control network 18. This may allow control devices 19, 52 to become aware of each other and to engage in a merging procedure in response hereto, even when connected to different transmission channels. One or more other devices 2, 3, 4, 8, 19, 52, 62, 63, 64, 65, 66 may preferably each be adapted to intermittently transmit a network control signal and/or listen for network control signals using the dedicated transmission channel when it is not connected to a control device 19, 52. One or more control devices 19, 52 may preferably be adapted to engage in a merging procedure with a predefined time delay after becoming aware of another control device 19, 52 and/or after performing an actual split in order to avoid re-merging subnets 18 immediately after having split the wireless control network 18.

The network controller 19, 52 may preferably execute an initial portion of the network splitting procedure multiple times before detecting the second split event. The initial portion of the network splitting procedure preferably comprises assigning one or more devices 2, 3, 4, 8, 19, 52, 62, 63, 64, 65, 66 to subnets 18, assigning master and slave roles to one or more control devices 19, 52 and/or providing network control signals comprising an indication of one or more assignments to one or more control devices 19, 52, however, such that assigning is not be effected until after detection of a second split event. This may allow the control devices 19, 52 to be always prepared for an actual splitting of the wireless control network 18 when the second split event is detected, such that the actual splitting may take place without requiring further communication between the control devices 19, 52.

During the initial portion of the network splitting procedure, the network controller 19, 52 may preferably determine an individual set of assignments for each of one or more predefined second split events. This may allow the control devices 19, 52 to be always prepared for multiple ways of splitting the wireless control network 18, e.g. in response to moving different sets of devices 2, 3, 4, 8, 19, 52, 62, 63, 64, 65, 66 away from the remaining devices 2, 3, 4, 8, 19, 52, 62, 63, 64, 65, 66.

The initial portion of the network splitting procedure may preferably further comprise prompting the user for a decision in response to detecting an ambiguous system state, such as e.g. when a determined assignment would cause release of a currently active audio connection 15, 16, 17, 44, 47, 48, recording a decision in response to detecting a user action and modifying one or more assignments in dependence on the recorded decision. The desktop telephone system 61 may preferably prompt the user and/or detect a user action through one or more user interfaces of one or more devices 2, 3, 4, 8, 19, 52, 62, 63, 64, 65, 66. For instance in a sixth scenario, the desktop telephone system 61 may be simultaneously engaged in two or more telephone conversations and/or multiple sound interface devices 2, 3, 4, 8, 62, 63, 64 may be simultaneously engaged in one telephone conversation. In this scenario, it may be difficult to determine which of the respective audio connections 15, 16, 17, 44, 47, 48 may or shall be released when the actual split is performed. The network controller 19, 52 may e.g. cause one or more user interfaces to present one or more suggestions for the split and allow the user to make a choice. The user may e.g. make a choice by picking up or hanging up one or more sound interface devices 2, 3, 4, 8, 62, 63, 64, and the network controller 19, 52 may detect this or these actions as described further above and modify one or more assignments accordingly.

One or more control devices 19, 52 are preferably each adapted to store usage information allowing determination of previous and/or typical system usage, such as e.g. which devices 2, 3, 4, 8, 19, 52, 62, 63, 64, 65, 66 have been or are typically, i.e. most often, connected together through a common subnet 18, which devices 2, 3, 4, 8, 19, 52, 62, 63, 64, 65, 66 have been or are typically moved away from other devices 2, 3, 4, 8, 19, 52, 62, 63, 64, 65, 66, which devices 2, 3, 4, 8, 19, 52, 62, 63, 64, 65, 66—or combinations thereof—have been or are typically involved in a telephone conversation, which audio connections 15, 16, 17, 44, 47, 48 have been or are typically involved in a telephone conversation, etc. The usage information may be stored e.g. as complete data history, as compressed data history and/or in form of statistical values. Usage information may be removed or marked as obsolete after a predefined time period, such as e.g. one month, three months or one year, and/or on user request in order to allow the determination of previous or typical usage to adapt faster to recent patterns.

One or more control devices 19, 52 preferably each comprise a storage (not shown) adapted to hold stored register information, stored usage information and/or stored configuration information. The storage is preferably non-volatile, so that stored information may be retrieved after a power-off of the respective control device 19, 52, at least for those portions of the storage adapted to hold usage information and configuration information.

Thus, the control devices 19, 52 may exchange registered information when they become aware of each other, e.g. in order to hand over the master role properly, to allow joining subnets 18, when the wireless control network 18 is being divided and/or when a control device 19, 52 becomes aware of a currently unregistered device 2, 3, 4, 8, 62, 63, 64, 65, 66, e.g. as a result of user interaction Generally, network control signals and system control signals 21, 23, 24, 25, 26, 31, 32, 42, 43, 45 are preferably provided through the wireless control network 18, however, the wireless control network 18 may be bypassed when the provider and the recipient of a particular signal are arranged within a common housing, such as within a mobile phone 2, 62.

In any of the embodiments described above, the desktop telephone system 1, 51, 61 may be adapted to transmit types of information further to those mentioned above through the wireless control network 18. For instance, one or more of the devices 2, 3, 4, 8, 19, 52, 62, 63, 64, 65, 66 may be adapted to record an acoustic environment noise level and provide a signal indicating the recorded acoustic environment noise level to the wireless control network 18. One or more of the devices 2, 3, 4, 8, 19, 52, 62, 63, 64, 65, 66 may be adapted to receive a signal indicating a recorded acoustic environment noise level from the wireless control network 18 and to control e.g. the processing of an audio signal, the output level of an acoustic alert signal and/or the output level of a sound output interface in dependence on the recorded acoustic environment noise level. In similar way, one or more of the devices 2, 3, 4, 8, 19, 52, 62, 63, 64, 65, 66 and/or a token device may be adapted to detect the presence and/or the identity of a user, e.g. by means of a proximity sensor, a touch sensor, a fingerprint sensor or the like, and to transmit a signal indicating the detected presence and/or identity of the user to the wireless control network 18, and one or more of the devices 2, 3, 4, 8, 19, 52, 62, 63, 64, 65, 66 may be adapted to receive a signal indicating a detected presence and/or identity of a user from the wireless control network 18 and to control an action detector 22, 30 and/or a user interface in dependence on the detected presence and/or identity of the user. One or more of the devices 2, 3, 4, 8, 19, 52, 62, 63, 64, 65, 66 that has already detected presence and/or identity of the user may subsequently act as a token device. A token device may e.g. repeatedly provide a signal indicating a presence and/or identity of a user to the wireless control network 18. Thus, desktop telephone system 1, 51, 61 may provide improved reaction to acoustic environment noise, a central lock feature for the entire system 1, 51, 61, user-dependent access to functions, telephone networks 7, 11, 67, devices 2, 3, 4, 8, 19, 52, 62, 63, 64, 65, 66 or user interfaces, a user-specific configuration, etc.

Any of the desktop telephone systems 1, 52, 61 described above may further comprise any suitable combination of the features described further above as generally possible features of a desktop telephone system. In any desktop telephone system 1, 52, 61, any gateway device 2, 3, 62, 63 may further comprise any suitable combination of the features described further above as generally possible features of a gateway device. Furthermore, any sound interface device 2, 3, 4, 8, 62, 63, 64 may further comprise any suitable combination of the features described further above as generally possible features of a sound interface device and/or a sound interface. Also, any device 2, 3, 4, 8, 19, 52, 62, 63, 64, 65, 66 connectable to the wireless control network 18 preferably comprises a corresponding wireless transmitter, receiver or transceiver for connecting to one or more transmission media of the wireless control network 18.

Each of the devices 2, 3, 4, 8, 19, 52, 62, 63, 64, 65, 66 of the desktop telephone systems 1, 52, 61 described above preferably comprises one or more electronic circuits, such as e.g. analog circuits, digital circuits, microprocessors, signal processors or the like, adapted to perform the described operations as is already known for similar devices of the prior art. Each of the devices 2, 3, 4, 8, 19, 52, 62, 63, 64, 65, 66 is preferably implemented as digital circuits operating on digital signals, but any portions hereof may be implemented as analog circuits operating on analog signals. Where necessary, any of the devices 2, 3, 4, 8, 19, 52, 62, 63, 64, 65, 66 may comprise analog-to-digital and/or digital-to-analog converters. Functional blocks of digital circuits may be implemented in hardware, firmware or software, or any combination hereof. Digital circuits may perform the functions of multiple functional blocks in parallel and/or in interleaved sequence, and functional blocks may distributed in any suitable way among multiple hardware units, such as e.g. signal processors, microcontrollers and other integrated circuits.

Thus, a desktop telephone system 1, 51, 61 may comprise one or more control devices 19, 52, two or more sound interface devices 2, 3, 4, 8, 62, 63, 64 each being adapted to provide a sound interface to a user during telephone conversations and two or more gateway devices 2, 3, 62, 63 each being adapted to serve as a telephone gateway between a telephone network 7, 11, 67 and each of the two or more sound interface devices 2, 3, 4, 8, 62, 63, 64 during telephone conversations. A method for operating the desktop telephone system 1, 51, 61 may comprise: by any of the two or more gateway devices 2, 3, 62, 63 providing a call announcement signal 21, 41 to a wireless control network 18 in response to detecting an incoming telephone call 20, 40 from a telephone network 7, 11, 67; by any of the two or more sound interface devices 2, 3, 4, 8, 62, 63, 64 providing a user accept signal 23, 31 to the wireless control network 18 in response to detecting a predefined accept action performed by the user; by any of the one or more control devices 19, 52 receiving a first call announcement signal 21, 41 and a first user accept signal 23, 31, at least one of the first call announcement signal 21, 41 and the first user accept signal 23, 31 being received from the wireless control network 18, determining a first gateway device 2, 3, 62, 63 of the two or more gateway devices 2, 3, 62, 63 as source of the first call announcement signal 21, 41, determining a first sound interface device 2, 3, 4, 8, 62, 63, 64 of the two or more sound interface devices 2, 3, 4, 8, 62, 63, 64 as source of the first user accept signal 23, 31, determining a relationship between the first call announcement signal 21, 41 and the first user accept signal 23, 31, and causing the desktop telephone system 1, 51, 61 to establish a first audio connection 15, 16, 17, 44, 47, 48 between the first gateway device 2, 3, 62, 63 and the first sound interface device 2, 3, 4, 8, 62, 63, 64 in dependence on the determined relationship.

Correspondingly, a control device 19, 52 for controlling a desktop telephone system 1, 51, 61 may be adapted to be connected to a wireless control network 18. A method for operating the control device 19, 52 may comprise: receiving a first call announcement signal 21, 41 and a first user accept signal 23, 31, at least one of the first call announcement signal 21, 41 and the first user accept signal 23, 31 being received from the wireless control network 18, determining a first gateway device 2, 3, 62, 63 as source of the first call announcement signal 21, 41, determining a first sound interface device 2, 3, 4, 8, 62, 63, 64 as source of the first user accept signal 23, 31, determining a relationship between the first call announcement signal 21, 41 and the first user accept signal 23, 31, and providing an audio connect signal 25, 26, 32, 42, 43 to the wireless control network 18 in dependence on the determined relationship in order to cause the desktop telephone system 1, 51, 61 to establish a first audio connection 15, 16, 17, 44, 47, 48 between the first gateway device 2, 3, 62, 63 and the first sound interface device 2, 3, 4, 8, 62, 63, 64. The method for operating the control device 19, 52 may e.g. by executed by a programmable device, such as e.g. a laptop computer 63 or a mobile phone 2, 62, equipped with a computer program comprising instructions for the programmable device enabling or causing the programmable device to execute the method. The computer program may be stored on a non-transitory computer storage medium.

The detailed description given herein and the specific examples indicating preferred embodiments of the invention are intended to enable a person skilled in the art to practice the invention and should thus be seen mainly as an illustration of the invention. The person skilled in the art will be able to readily contemplate further applications of the present invention as well as advantageous changes and modifications from this description without deviating from the scope of the invention. Any such changes or modifications mentioned herein are meant to be non-limiting for the scope of the invention.

The invention is not limited to the embodiments disclosed herein, and the invention may be embodied in other ways within the subject-matter defined in the following claims. As an example, features of the described embodiments may be combined arbitrarily, e.g. in order to adapt the system, the devices and/or the method according to the invention to specific requirements or uses.

It is further intended that the structural features of the system and/or devices disclosed herein may be combined with the methods, when appropriately substituted by a corresponding process. Embodiments of the methods generally have the same advantages as the corresponding systems and/or devices.

Reference numerals and literal identifiers that appear in brackets in the claims are intended to be non-limiting for their scope.

The invention claimed is:

1. A desktop telephone system comprising:
   a. two or more sound interface devices each being adapted to provide a sound interface to a user during telephone conversations and
   b. two or more gateway devices each being adapted to serve as a telephone gateway between a telephone network and each of said two or more sound interface devices during telephone conversations,
   c. each of said two or more gateway devices further being adapted to provide a call announcement signal in response to detecting an incoming telephone call from a telephone network, and
   d. each of said two or more sound interface devices further including
      1. an action detector adapted to provide a user accept signal in response to detecting a predefined accept action performed by said user,
      2. wherein at least one of said two or more gateway devices further is adapted to provide said call announcement signal to a wireless control network;
      3. that at least one of said two or more sound interface devices further is adapted to provide said user accept signal to said wireless control network; and that said desktop telephone system further includes
         a. one or more control devices each being adapted to receive a first call announcement signal and a first user accept signal,
         b. at least one of said first call announcement signal and said first user accept signal being received from said wireless control network,
            1. to determine a first gateway device of said two or more gateway devices as source of said first call announcement signal,
            2. to determine a first sound interface device of said two or more sound interface devices as source of said first user accept signal,
            3. to determine a relationship between said first call announcement signal and said first user accept signal, and
            4. to cause said desktop telephone system to establish a first audio connection between said first gateway device and said first sound interface device in dependence on said determined relationship.

2. A desktop telephone system according to claim 1, wherein each of said two or more gateway devices is adapted to provide said call announcement signal to said wireless control network, wherein each of said two or more sound interface devices further is adapted to provide said user accept signal to said wireless control network, and wherein at least one of said one or more control devices is adapted to receive each of said first call announcement signal and said first user accept signal from said wireless control network.

3. A desktop telephone system according to claim 1, wherein at least one of said one or more control devices is comprised by one of said two or more gateway devices.

4. A desktop telephone system according to claim 1, wherein at least one of said one or more control devices is comprised by one of said two or more sound interface devices.

5. A desktop telephone system according to claim 1, wherein at least one of said one or more control devices is adapted to provide an audio connect signal to said wireless control network and wherein at least one of said first gateway device and said first sound interface device is adapted to establish said first audio connection in response to receiving said audio connect signal from said wireless control network.

6. A desktop telephone system according to claim 5, wherein a second gateway device of said two or more gateway devices different from said first gateway device and/or a second sound interface device of said two or more sound interface devices different from said first sound interface device is adapted to release an audio connection in response to receiving said audio connect signal from said wireless control network.

7. A desktop telephone system according to claim 1, wherein at least one of said one or more control devices is adapted to provide an audio disconnect signal to said wireless control network and wherein a second gateway device of said two or more gateway devices different from said first gateway device and/or a second sound interface device of said two or more sound interface devices different from said first sound interface device is adapted to release an audio connection in response to receiving said audio disconnect signal from said wireless control network.

8. A desktop telephone system according to claim 1, wherein said one or more control devices comprises two or more control device, wherein each of said two or more control devices is adapted to operate in a master mode wherein it provides at least said first call announcement or first user accept signals to the wireless control network, and wherein at least one of said two or more control devices is adapted to temporarily operate in a slave mode wherein it provides neither said first call announcement or first user accept signals to the wireless control network, and wherein said desktop telephone system further comprises a network controller adapted to cause or allow a first control device of said two or more control devices to operate in said master mode and to cause all control devices of said two or more control devices different from said first control device to operate in said slave mode.

9. A desktop telephone system according to claim 8, wherein said network controller further is adapted to cause a second control device of said two or more control devices different from said first control device to temporarily operate in said master mode and to cause all control devices of said two or more control devices different from said second control device to operate in said slave mode.

10. A desktop telephone system according to claim 9, wherein said network controller further is adapted to cause said second control device to operate in said master mode in response to receiving and/or transmitting said first call announcement signal, said first user accept signal, said audio connect signal and/or said audio disconnect signal.

11. A desktop telephone system according to claim 1, wherein said wireless control network is implemented according to a Bluetooth Low Energy standard.

12. A desktop telephone system according to claim 1, wherein said first audio connection is a wireless connection.

13. A desktop telephone system according to claim 12, wherein said wireless control network is implemented according to a first wireless communication standard and a first communication protocol according to said first wireless communication standard and wherein said first audio connection is implemented according to a second wireless communication standard different from said first wireless communication standard and/or a second communication protocol different from said first communication protocol.

14. A desktop telephone system according to claim 12, wherein said first audio connection is implemented according to a Bluetooth Classic protocol.

15. A method for operating a desktop telephone system comprising one or more control devices, two or more sound interface devices each being adapted to provide a sound interface to a user during telephone conversations and two or more gateway devices each being adapted to serve as a sound interface devices during telephone conversations, the method comprising:
 a. by any of said two or more gateway devices, providing a call announcement signal to a wireless control network in response to detecting an incoming telephone call from a telephone network;
 b. by any of said two or more sound interface devices, providing a user accept signal to said wireless control network in response to detecting a predefined accept action performed by said user;
 c. by any of said one or more control devices, receiving a first call announcement signal and a first user accept signal, at least one of said first call announcement signal and said first user accept signal being received from said wireless control network,
 d. determining a first gateway device of said two or more gateway devices as source of said first call announcement signal,
 e. determining a first sound interface device of said two or more sound interface devices as source of said first user accept signal, determining a relationship between said first call announcement signal and said first user accept signal, and causing said desktop telephone system to establish a first audio connection between said first gateway device and said first sound interface device in dependence on said determined relationship.

* * * * *